(12) United States Patent
Stein et al.

(10) Patent No.: US 7,421,076 B2
(45) Date of Patent: Sep. 2, 2008

(54) ADVANCED ENCRYPTION STANDARD (AES) ENGINE WITH REAL TIME S-BOX GENERATION

(75) Inventors: Yosef Stein, Sharon, MA (US); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 598 days.

(21) Appl. No.: 10/665,338

(22) Filed: Sep. 17, 2003

(65) Prior Publication Data

US 2005/0058285 A1    Mar. 17, 2005

(51) Int. Cl.
H04L 9/06    (2006.01)
(52) U.S. Cl. ........................... 380/42; 380/37
(58) Field of Classification Search .................. 380/37, 380/42
See application file for complete search history.

(56) References Cited

U.S. PATENT DOCUMENTS

| | | | |
|---|---|---|---|
| 3,303,477 A | 2/1967 | Voigt | |
| 3,805,037 A | 4/1974 | Ellison | |
| 4,722,050 A | 1/1988 | Lee et al. | |
| 4,847,801 A | 7/1989 | Tong | |
| 4,852,098 A | 7/1989 | Brechard et al. | |
| 4,918,638 A | 4/1990 | Matsumoto et al. | |
| 5,095,525 A | 3/1992 | Almgren et al. | |
| 5,214,763 A | 5/1993 | Blaner et al. | |
| 5,379,243 A | 1/1995 | Greenberger et al. | |
| 5,386,523 A | 1/1995 | Crook et al. | |
| 5,446,850 A | 8/1995 | Jeremiah et al. | |
| 5,689,452 A | 11/1997 | Cameron | |
| 5,832,290 A | 11/1998 | Gostin et al. | |
| 5,996,057 A | 11/1999 | Scales, III et al. | |
| 6,049,815 A | 4/2000 | Lambert et al. | |
| 6,199,086 B1 | 3/2001 | Dworkin et al. | |
| 6,199,087 B1 | 3/2001 | Blake et al. | |
| 6,223,320 B1 | 4/2001 | Dubey et al. | |
| 6,230,179 B1 | 5/2001 | Dworkin et al. | |

(Continued)

FOREIGN PATENT DOCUMENTS

EP    1 246 389 A1    10/2002

OTHER PUBLICATIONS

Wolkerstorfer et al., "An ASIC Implementation of teh AES SBoxes," 2002, Springer-Verlag Berlin Heidelberg, pp. 67-78.*

(Continued)

Primary Examiner—Kambiz Zand
Assistant Examiner—William S Powers
(74) Attorney, Agent, or Firm—Iandiorio Teska & Coleman

(57) ABSTRACT

An advanced encryption standard (AES) engine with real time S-box generation includes a Galois field multiplier system in a first mode responsive to a first data block for generating an AES selection (S-box) function by executing the multiplicative increase in $GF^1(2^m)$ and applying an affine over $GF(2)$ transformation to obtain a subbyte transformation; and a shift register system for transforming the subbyte transformation to obtain a shift row transformation; the Galois field multiplier system is responsive in a second mode to the shift row transformation to obtain a mix column transformation and add a round key for generating in real time an advanced encryption standard cipher function of the first data block.

31 Claims, 15 Drawing Sheets

U.S. PATENT DOCUMENTS

| | | | |
|---|---|---|---|
| 6,246,768 | B1 | 6/2001 | Kim |
| 6,349,318 | B1 | 2/2002 | Vanstone et al. |
| 6,434,662 | B1 | 8/2002 | Greene et al. |
| 6,587,864 | B2 | 7/2003 | Stein et al. |
| 6,937,727 | B2 * | 8/2005 | Yup et al. ............ 380/37 |
| 2002/0041685 | A1 | 4/2002 | McLoone et al. |
| 2002/0147825 | A1 | 10/2002 | Stein et al. |
| 2002/0152219 | A1 * | 10/2002 | Singh ............ 707/101 |
| 2002/0191784 | A1 * | 12/2002 | Yup et al. ............ 380/37 |
| 2003/0039355 | A1 | 2/2003 | McCanny et al. |
| 2003/0072444 | A1 * | 4/2003 | Hu et al ............ 380/37 |
| 2003/0103626 | A1 | 6/2003 | Stein et al. |
| 2003/0105791 | A1 | 6/2003 | Stein et al. |
| 2003/0110196 | A1 | 6/2003 | Stein et al. |
| 2003/0115234 | A1 | 6/2003 | Stein et al. |
| 2003/0133568 | A1 | 7/2003 | Stein et al. |
| 2003/0140211 | A1 | 7/2003 | Stein et al. |
| 2003/0140212 | A1 | 7/2003 | Stein et al. |
| 2003/0140213 | A1 | 7/2003 | Stein et al. |
| 2003/0149857 | A1 | 8/2003 | Stein et al. |

OTHER PUBLICATIONS

Murphy et al., "Essential Algebraic Structure within the AES," 2002, Springer-Verlag Berlin Heidelberg, pp. 1-16.*

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

Máire McLoone and J.V. McCanny, *High Performance Single-Chip FPGA Rijndael Algorithm Implementations*, CHES 2001 Proc, LNCS 2162, 65-76 (ç.K. Koç et al. eds. May 16, 2001).

Elixent, *Changing the Electronic Landscape* (2001) <http://www.elixent.com> (elixent—Bristol, UK).

Elixent Application Note *JPEG Codec* (Dec. 9, 2002) <http://www.elixent.com/assets/jpeg-coder.pdf> (elixent—Bristol, UK).

U.S. Appl. No. 10/440,330, filed May 16, 2003, Stein et al.

U.S. Appl. No. 10/395,620, filed Mar. 24, 2003, Stein et al.

V. Baumgarte et al., *Pact XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

* cited by examiner

ADVANCED ENCRYPTION STANDARD (AES) ENGINE WITH REAL TIME S-BOX GENERATION

FIELD OF THE INVENTION

This invention relates to an advanced encryption standard (AES) engine with real time S-box generation.

BACKGROUND OF THE INVENTION

An encryption engine for performing the American National Standard Institute (ANSI) advanced encryption standard (AES) enciphers and deciphers blocks of data, typically 128 bits (block size) using a variable length key up to 256 bits. Deciphering is accomplished using the same key that was used for encrypting but with the schedule of addressing the key bits altered so that the deciphering is the reverse of the encryption process.

There are a number of different algorithms for implementing AES; one of the more prominent ones is the Rijndael algorithm. Typically, that algorithm receives four, four byte, thirty-two bit words upon which it performs a subbyte transformation which includes a multiplicative inverse in a Galois field $GF^{-1}(2^8)$ and applying an affine (over $GF(2)$) transformation. Next a shift rows transformation is effected followed by a mix columns transformation which applies a mix column transformation and adds a round key.

This series of steps is repeated a number of times. The number of iterations depends on the key length and block size in accordance with the Rijndael algorithm. For example, for a key length of four, thirty-two bit words (128 bits) and a block size of four, thirty-two bit words the number of iterations is ten; for a key length of six (192 bits) and block size of four the number of iterations is twelve and for a key length of eight (256 bits) and block size of four the number of iterations is fourteen, where key length is the number of thirty-two bit words in the key and block size is the number of thirty-two bit words to be enciphered at a time. Thus, for example, with a key length of four and block size of four calling for ten iterations or rounds, ten round keys of four, thirty-two bit words each needs to be generated from an input master key of four, thirty-two bit words, one for each iteration or round. These are generated as forty different subkeys through one or two steps depending upon the key length and number of rounds. The first word in the generation of a round key undergoes (a) a word rotation, followed by the subword, a combination of inverse Galois field and affine transformation, and a Rcon[i] (an iteration dependent value) is added over the $GF(2^8)$ field; (b) a thirty-two bit word permutation exclusive Or-ed with the result of (a). For example, with ten rounds and a key length of four, every fourth subkey generation cycle undergoes both (a) and (b) steps. The other key generation cycles undergo only, (c) a thirty-two bit word permutation exclusive Or-ed with the previous subkey. Thus cycles 0, 4, 8, 12, 16, 20, 24, 28, 32, 36, 40 employ both (a), (b) steps, the remaining cycles use only (c) step. Typically, this requires 90 or more clock cycles for each word or 360 clock cycles for each block consisting of four words, and 3600 clock cycles for completing a Rijndael algorithm for AES. Thus, for a 10 megabit data stream operating on the four, thirty-two bit word block of one hundred and twenty-eight bits the requirement is for 281 Mega Instructions Per Second (MIPS).

One approach to this problem employs a programmable data encryption engine for performing the cipher function of an advanced encryption standard (AES) algorithm including a first parallel look-up table responsive to a first data block for implementing an AES selection function and executing the multiplicative inverse in $GF^{-1}(2^8)$ and applying an affine over $GF(2)$ transformation to obtain the subbyte transformation. A second parallel look-up table transforms a subbyte transformation to obtain a shift row transformation. A Galois field multiplier transforms the shift row transformation to obtain a mix column transformation and adds a round key resulting in an advanced encryption standard cipher function of the first data block as more fully disclosed in U.S. Patent Application entitled PROGRAMMABLE DATA ENCRYPTION ENGINE FOR ADVANCED ENCRYPTION STANDARD ALGORITHM, Ser. No. 10/255,971, filed Sep. 26, 2002, (AD-298J) incorporated herein in its entirety by this reference.

The approach is appealing, however, because the conventional technique for calculation of the AES selection function, S-box values, requiring executing multiplicative inverse in $GF^{-1}(2^m)$ e.g. $GF^{-1}(2^8)$ and applying an affine over $GF(2)$ transformation to obtain subbyte transformation is complicated and requires even more processing time. So calculating the values ahead of time and storing them in a look-up table is an advantage. One shortcoming of this approach is that each look-up operation is a serial operation that requires a number of memory cycles to complete which in a deep pipeline machine places a limit on system performance speed.

BRIEF SUMMARY OF THE INVENTION

It is therefore an object of this invention to provide an improved advanced encryption standard (AES) engine.

It is a further object of this invention to provide such an advanced encryption standard (AES) engine which avoids the delays associated with parallel look-up tables and other prior art approaches.

It is a further object of this invention to provide such an improved advanced encryption standard (AES) engine implementable in software and/or hardware.

It is a further object of this invention to provide such an improved advanced encryption standard (AES) engine which is much faster than prior art approaches.

It is a further object of this invention to provide such an improved advanced encryption standard (AES) engine which is extremely flexible and can be re-programmed for many different operations.

It is a further object of this invention to provide such an improved advanced encryption standard (AES) engine which operates to generate the S-box functions in real time, and avoids delays associated with memory cycle times attendant on parallel look-up systems.

It is a further object of this invention to provide such an improved advanced encryption standard (AES) engine which is programmable that a few or even one Galois field linear transformer can be configured to do all the necessary tasks.

It is a further object of this invention to provide such an improved advanced encryption standard (AES) engine which admits of compounding of Galois field linear transformer functions so that one transformer can combine a number of operations.

It is a further object of this invention to provide such an improved advanced encryption standard (AES) engine which executes a multiply square technique to obtain a reciprocal function in $\underline{m-1}$ operations rather than $2^{m-1}$ operations where $\underline{m}$ is the degree of the implicated Galois field e.g. $GF^{-1}(2^m)$.

It is a further object of this invention to provide such an improved advanced encryption standard (AES) engine which can be applied in real time generate the subkeys as well as the S-box functions.

The invention results from the realization that an advanced encryption standard (AES) engine with real time S-box generation which is faster even than a parallel look-up approach can be achieved with a Galois field multiplier system which in a first mode is responsive to a first data block for generating an AES selection (S-box) function by executing the multiplicative increase in $GF^{-1}(2^m)$ and applying an affine over $GF(2)$ transformation to obtain a subbyte transformation; and shift register system for transforming the subbyte transformation to obtain a shift row transformation; the Galois field multiplier system is responsive, in a second mode, to the shift row transformation to obtain a mix column transformation and adding a round key for generating in real time an advanced encryption standard cipher function of the first data block. The operation in each mode and state may be performed by a separate Galois field linear transformer or a few or even just one Galois field linear transformer may be used and reconfigured by a programmer/controller to perform the different operations. The Galois field linear transformer may be compounded to perform more than one function in the operation.

This invention features an advanced encryption standard (AES) engine with real time S-box generation including a Galois field multiplier system in a first mode responsive to a first data block for generating an AES selection (S-box) function by executing the multiplicative increase in $GF^1(2^m)$ and applying an affine over $GF(2)$ transformation to obtain a subbyte transformation and a shift register system for transforming the subbyte transformation to obtain a shift row transformation. The Galois field multiplier system is responsive in a second mode to the shift row transformation to obtain a mix column transformation and adds a round key for generating in real time an advanced encryption standard cipher function of the first data block.

In a preferred embodiment the first mode may include two states for executing $\underline{m-1}$ cycles of operation including a first state for multiplying a subbyte by one to obtain a product and then squaring the product to obtain an intermediate result and repeating with the intermediate result m−2 times and a second state for performing the multiply and square operations one more time and transforming the final intermediate result to obtain the subbyte transformation. The Galois field multiplier system may include a Galois field linear transformer for each the mode. The Galois field multiplier system may include a Galois field linear transformer for each state of the first mode and for the second mode. The Galois field multiplier system may include a Galois field linear transformer and a program circuit for reconfiguring said Galois field linear transformer for each mode. The program circuit may further reconfigure the Galois field linear transformer for each state in the first mode. The program circuit may configure said Galois field linear transformer to perform a compound multiply-square operation in the first state. The program circuit may configure the Galois field linear transformer to perform a compound multiply-square operation in the first state and a compound multiply-square and affine subbyte transformation in the second state. The Galois field linear transformer associated with said second mode may be configured to multiply-accumulate to perform a mix column transformation and add a round key for generating an advanced encryption standard cipher function of the first data block. The Galois field linear transformer associated with said first state may be configured as a multiplier to perform a compound multiply-square operation. The Galois field linear transformer associated with the second state may be configured as a multiply-adder to perform a compound multiply-square and affine subbyte transformation. The Galois field multiplier system may include at least one Galois field linear transformer and an associated polynomial multiplier. The Galois field multiplier system may include a matrix of cells. There may be a key generator for providing a plurality of round keys. The key generator may include a key generator circuit responsive to a master key to generate the round keys. The key generator circuit may include the Galois field multiplier system in a third mode for executing a multiplicative inverse in $GF^1(2^m)$ and applying affine over $GF(2)$ transformation to obtain the round keys. The round key may include a plurality of subkeys. The third mode may include two states for executing $\underline{m-1}$ cycles of operation including a third state for multiplying a subkey by one to obtain a product and then squaring the product to obtain an intermediate result and repeating with the intermediate result m−2 times and a fourth state for performing the multiply and square operations one more time and transforming the final infinite result to obtain the subkey transformation. The Galois field multiplier system may include a Galois field transformer for each of the third and fourth states. The Galois field linear transformer may be reconfigured by the program circuit for the third mode. The program circuit may further reconfigure the Galois field linear transformer for each of the third and fourth states in the third mode. The program circuit may configure the Galois field linear transformer to perform a compound multiply-square operation in the third state. The program circuit may configure the Galois field linear transformer to perform a compound multiply-square operation and affine subkey transformation in the fourth state. The Galois field linear transformer associated with the third state may be configured as a multiplier to perform a compound multiply-square operation. The Galois field linear transformer associated with the fourth state may be configured as a multiply-adder to perform a compound multiply-square and affine subkey transformation. The Galois field multiplier system may include a polynomial multiplier circuit for multiplying two polynomials with coefficients over a Galois field to obtain their product, a Galois field linear transformer responsive to the polynomial multiplier circuit for predicting the modulo remainder of the polynomial product for an irreducible polynomial, a storage circuit for supplying to the Galois field linear transformer a set of coefficients for predicting the modulo remainder for a predetermined irreducible polynomial; and a Galois field adder circuit for adding the product of the multiplier circuit with a third polynomial with coefficients over a Galois field for performing the compound multiply and add operations in a single cycle. There may be a plurality of Galois field multiplier systems for simultaneously processing a plurality of subbytes. There may be a plurality of Galois field multiplier systems for simultaneously processing a plurality of subkeys.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
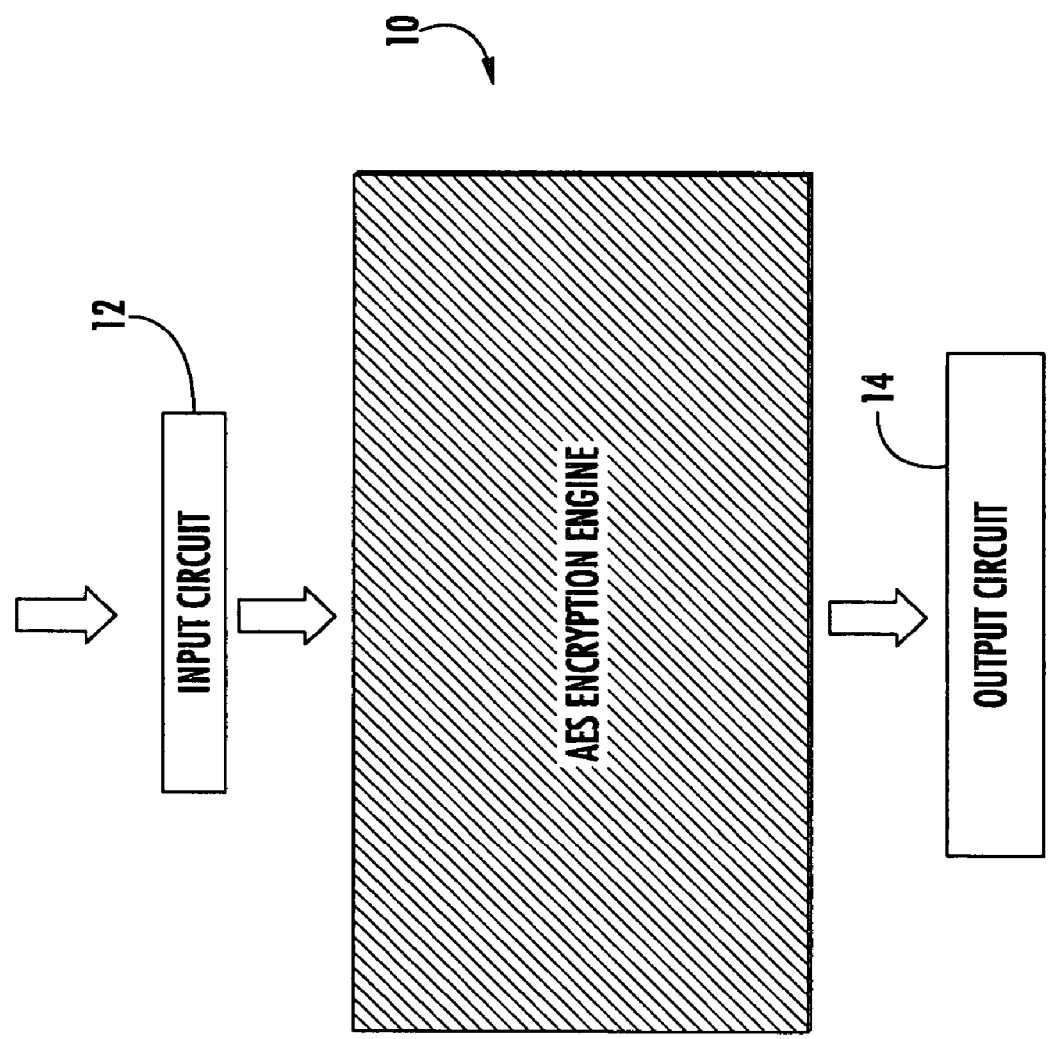
FIG. 1 is a block diagram of an advanced encryption standard (AES) encryption engine according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
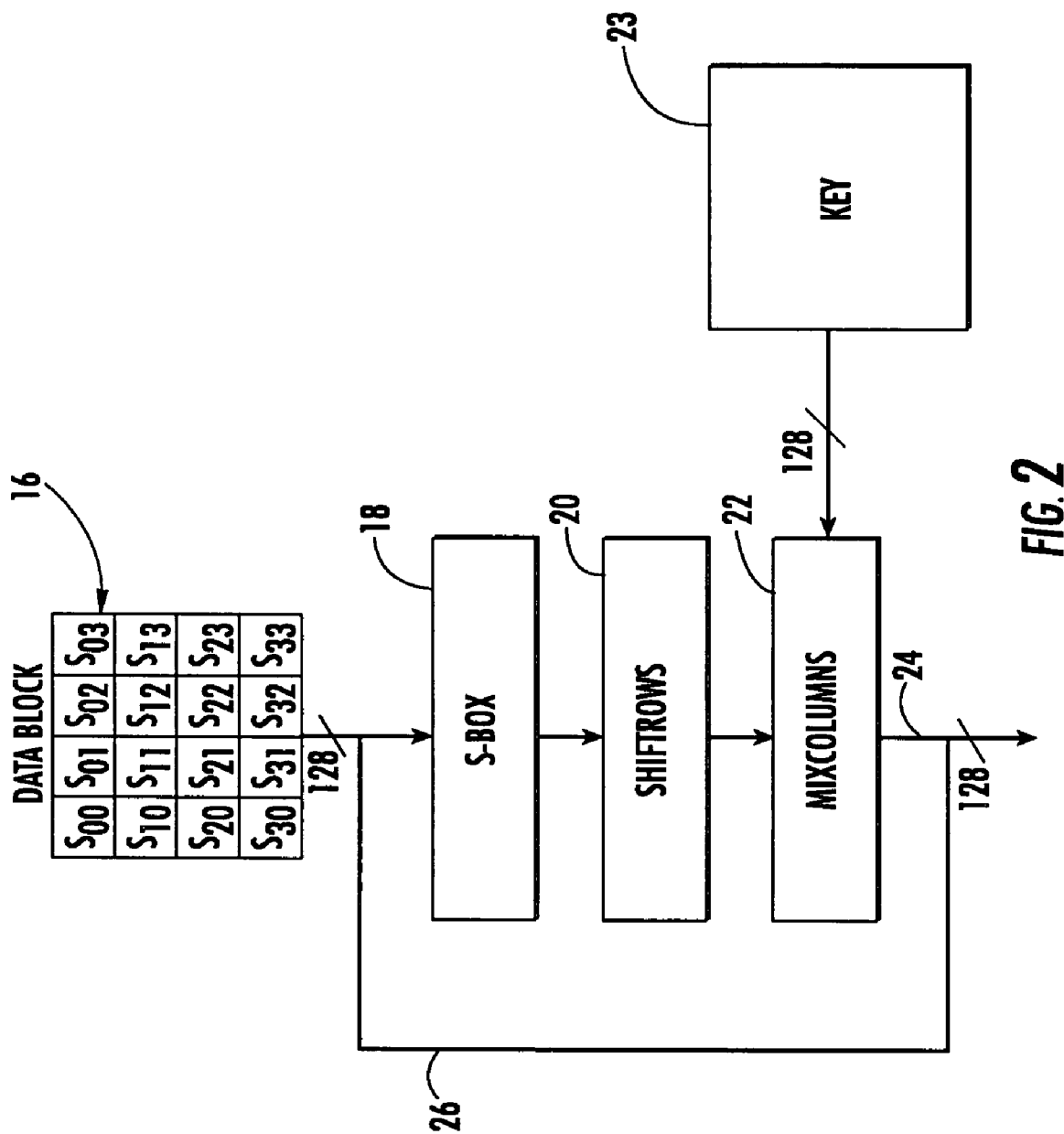
FIG. 2 is schematic block diagram showing the basic AES cipher algorithm.

There is shown in FIG. 1 an AES encryption engine 10 according to this invention with an associated input circuit 12 and output circuit 14. The advanced encryption standard (AES) algorithm performed by AES encryption engine 10 is illustrated in FIG. 2, where incoming data block 16 first undergoes an S-box transformation 18 then a shift row transformation 20 followed by a mix column transformation 22 in which key 23 is added. The output at 24 is fed back over line 26 a number of times, the number depending upon the particular AES algorithm chosen. For example, in Chart I below:

CHART I

Figure 3:
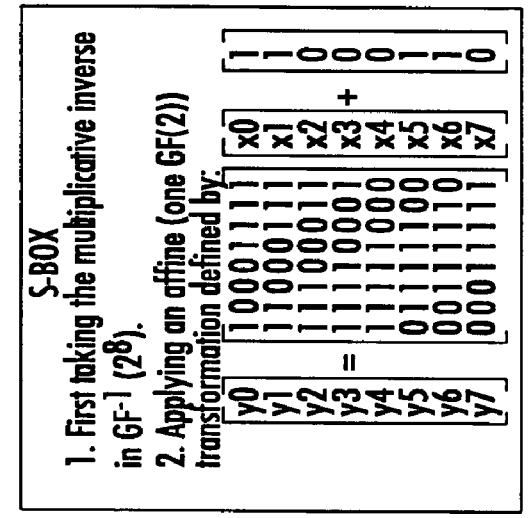
FIG. 3 is a schematic block diagram showing the subbyte transformation of the AES cipher algorithm of FIG. 2.
Figure 4:
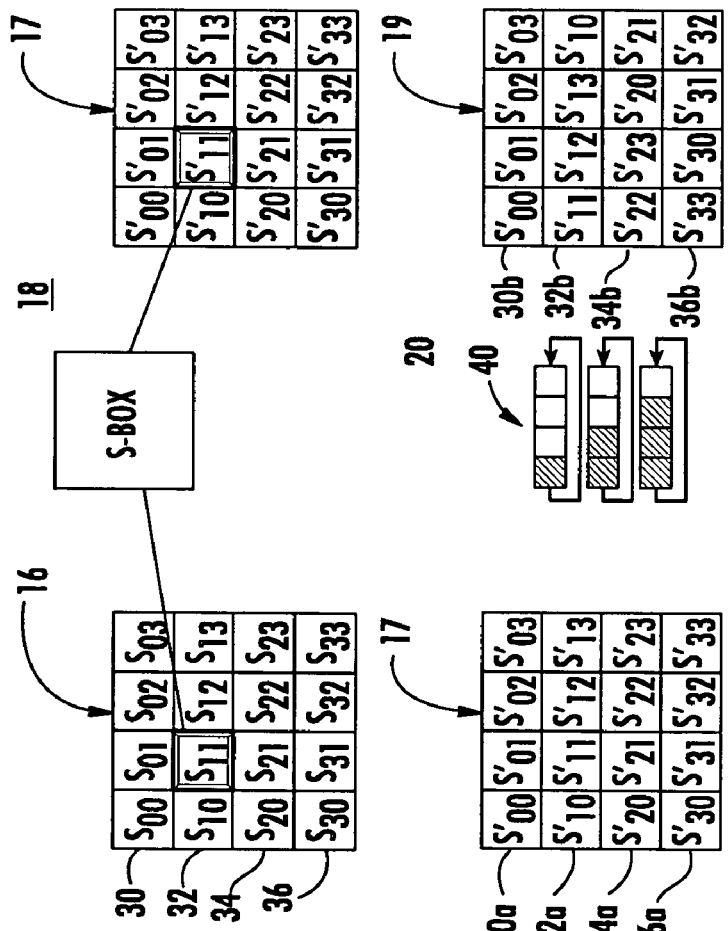
FIG. 4 is a schematic block diagram showing the shift row transformation of the AES cipher algorithm of FIG. 2.
Figure 5:
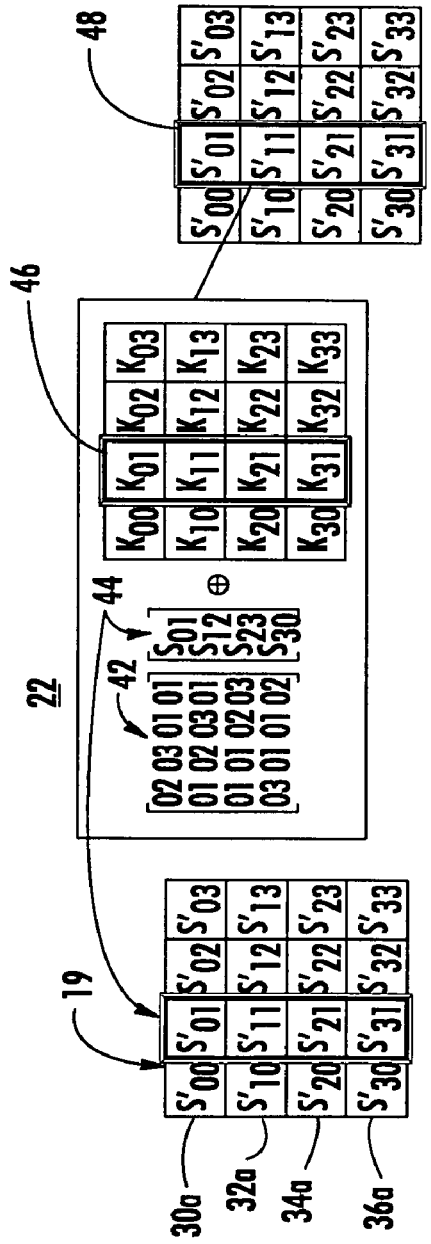
FIG. 5 is a schematic block diagram showing the mix column transformation and addition of a round key in accordance with the AES cipher algorithm of FIG. 2.

|         | Key Length (Nk words) | Block Size (Nb words) | Number of Rounds (Nr) |
|---------|-----------------------|-----------------------|-----------------------|
| AES-128 | 4                     | 4                     | 10                    |
| AES-192 | 6                     | 4                     | 12                    |
| AES-256 | 8                     | 4                     | 14                    | for the algorithm AES-128 the key length is four, the block size is four and the number of rounds or iterations is 10, whereas for AES-192, where the key length is six and block size is six, the number of iterations is 12 and for AES-256 the number of iterations is 14. Each time a round is executed a new key is introduced. The AES algorithm subbyte transformation is effected using an S-box wherein the data block 16 is comprised of four words 30, 32, 34, 36 each of four bytes, $S_{00}$-$S_{03}$, $S_{10}$-$S_{13}$, $S_{20}$-$S_{23}$, and $S_{30}$-$S_{33}$. The S-BOX transformation first takes the multiplicative inverse in $GF^{-1}(2^8)$ and then applies an affine over GF(2) transformation defined by the matrix expression as shown in box 38, FIG. 3. The output is the subbyte transformation 17 of data block 16. The subbyte transformation 17, FIG. 4 then undergoes a shift row transformation in which the first row 30a, is not rotated at all, the second row 32a is rotated one byte, the third row 34a is rotated two bytes, and the fourth row 36a is rotated three bytes. The shifting is depicted by the schematic 40 and results in the shift row transformed data block 19 wherein the same values appear but shifted one, two, and three places in rows 32b, 34b, and 36b. In mix column transformation and addition of the round key, FIG. 5, data block 19 is then multiplied a column at a time by the mix column transformation matrix 42. In this example the second column 44 is shown being multiplied by the mixed column transformation matrix. To this is added the round key in this case column 46, to obtain the completed advanced encryption standard cipher function 48 of the first data block 16.

Figure 6:
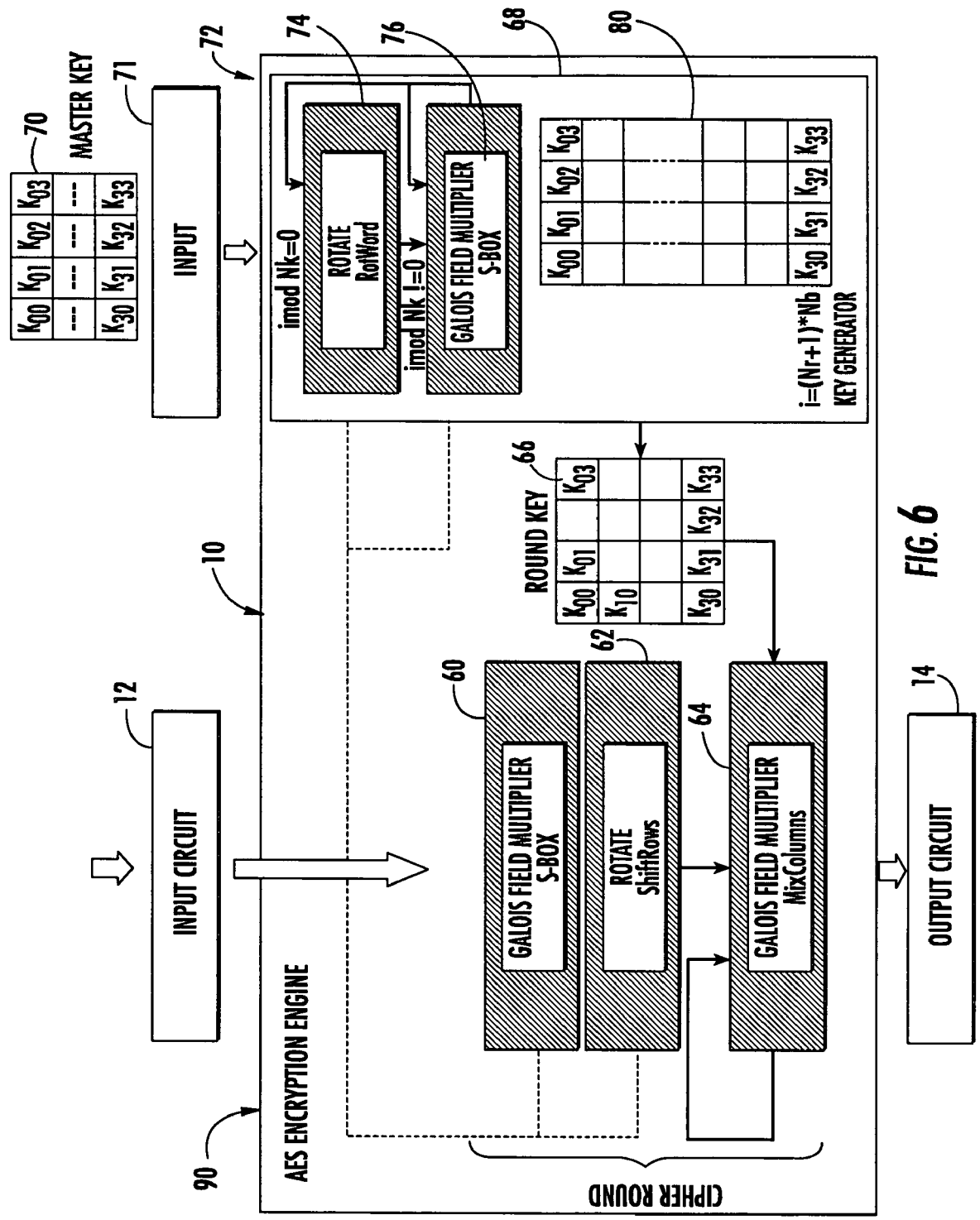
FIG. 6 is a more detailed schematic block diagram of the AES encryption engine of FIG. 1 according to this invention.

In one embodiment, according to this invention, AES encryption engine 10 may include a Galois field multiplier 60, FIG. 6, for performing the S-box transformation, a shift register 62 for performing the shift row transformation, and a Galois field multiplier 64 for performing the mix column and key addition operation. Each iteration a different key or round key is provided. For example, in an AES 128 algorithm implementation there will be ten rounds, each round will be supplied with a key. Each iteration a different round key 66 is introduced. The round keys are generated by the key generator 68 from a master key 70 introduced through input 71, by means of key generator circuit 72 which includes a rotation word shift register 74 and an S-box Galois field multiplier 76. The rotation word shift register 74 simply takes a word ($a_0$, $a_1$, $a_2$, $a_3$) as input and performs a cyclical permutation and returns the word as ($a_1$, $a_2$, $a_3$, $a_0$). The S-box Galois field multiplier 76 performs an S-box function similar to S-box function 18, FIG. 2 as depicted in more detail in FIG. 3. Once the keys or subkeys are generated and stored as at key storage 80 in FIG. 6, they are used a round key at a time for each iteration or round performed, where a round key includes four words of four 8-bit bytes each.

The Galois field multiplier system 90 including Galois field multipliers 60, 64 and 76 may be implemented with a simple Galois field multiplier which is programmable to be reconfigured to perform for each mode and state or may include a separate dedicated Galois field multiplier for each mode and state. For example, in FIG. 6, Galois field multiplier system shows three Galois field multipliers to perform five different functions. But in reality there may be but one Galois field multiplier reconfigured by a programmer/controller in a first mode to respond to a first data block to generate an AES selection, S-box, function by executing the multiplicative increase $GF^{-1}(2^m)$ and applying an affine over GF(2) transformation to obtain a subbyte transformation. Shift register 62 transforms the subbyte transformation to obtain a shift row transformation. The Galois field multiplier is reconfigured in a second mode to respond to the shift row transformation to obtain a mix column transformation and adding a round key for generating in real time an advanced encryption standard cipher function for the first data block. Or the two modes may be carried out by two Galois field multipliers 60 and 64 as depicted in FIG. 6. The first mode may include two states for executing m−1 cycles of operation including a first state for multiplying a subbyte by one to obtain a product and then squaring the product to obtain an intermediate result and repeating with the intermediate result m−2 times and a second state for performing the compound affine transform of the multiply and square operation one more time and transforming the first intermediate result to obtain the subbyte transformation. This, too, could be implemented by two separate Galois field multipliers, one for each state or the same Galois field multiplier could be reconfigured to perform each state.

Further, Galois field multiplier 76 may be yet another separate Galois field multiplier or it may be the same basic Galois field multiplier system 90 operating in a third mode for executing the multiplicative increase in $GF^{-1}(2^m)$ and applying affine over GF(2) transformation to obtain the round keys which may include a plurality of subkeys. And the third mode may also include two states a third and a fourth state for executing m−1 cycles of operation. In the third state a subkey is multiplied by one to obtain a product which is then squared to obtain an intermediate result. That action is repeated with the intermediate result m−2 times and then in the fourth state one more compound affine transform of the multiply-square operation is done and the final intermediate result is transformed to get the subkey transformation. Here again the two states could be carried out by two different Galois field multipliers or one Galois field multiplier reprogrammed or reconfigured to perform each state. In fact Galois field multiplier system 90 may include a single Galois field multiplier which is reconfigured to implement Galois field multipliers 60, 64, and 76.

Figure 7:
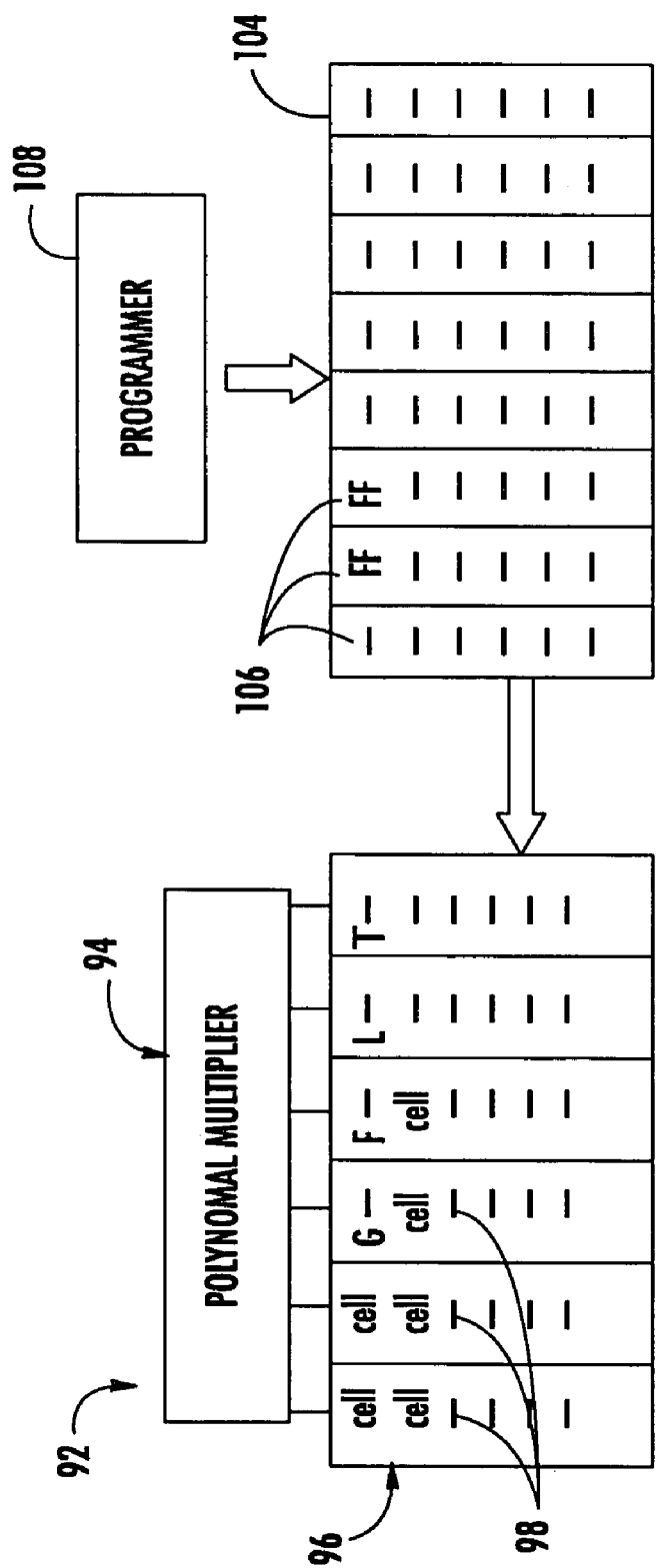
FIG. 7 is a more detailed view of a Galois field multiplier.
Figure 8:
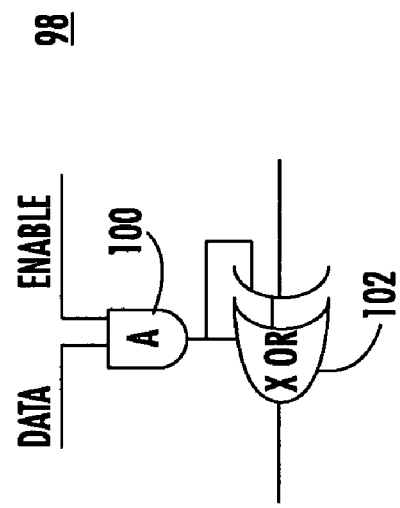
FIG. 8 is a detailed view of a cell of the Galois field linear transformer.

Each Galois field multiplier as illustrated by Galois field multiplier 92, FIG. 7, may include a polynomial multiplier 94 and Galois field linear transformer 96. Each cell 98, FIG. 8 of the Galois field linear transformer is composed of an AND gate 100 and an X-OR gate 102. AND gate 100 receives data and enable inputs and X-Or gate 102 receives the output of AND gate 100 and an input from a previous cell and provides its output to the next cell. A matrix 104 of flip flops 106, one for each cell, controls whether its associated cell is on or off. A sequence or controller or programmer circuit 118 applies the particular flip flop pattern repeated in each instance to reconfigure the Galois field linear transformer for its particular function. In this case a single Galois field linear transformer can be used to implement all modes and all states of Galois field multiplier 60, 64 and 76, FIG. 6, e.g. multiply, multiply accumulate, multiply add. The Galois field multiplier system is explained more fully in U.S. Patent Application entitled GALOIS FIELD MULTIPLY/MULTIPLY-ADD/MULTIPLY ACCUMULATE, Stein et al., filed Aug. 26, 2002 (AD-299J) incorporated herein in its entirety by this reference.

Figure 9:
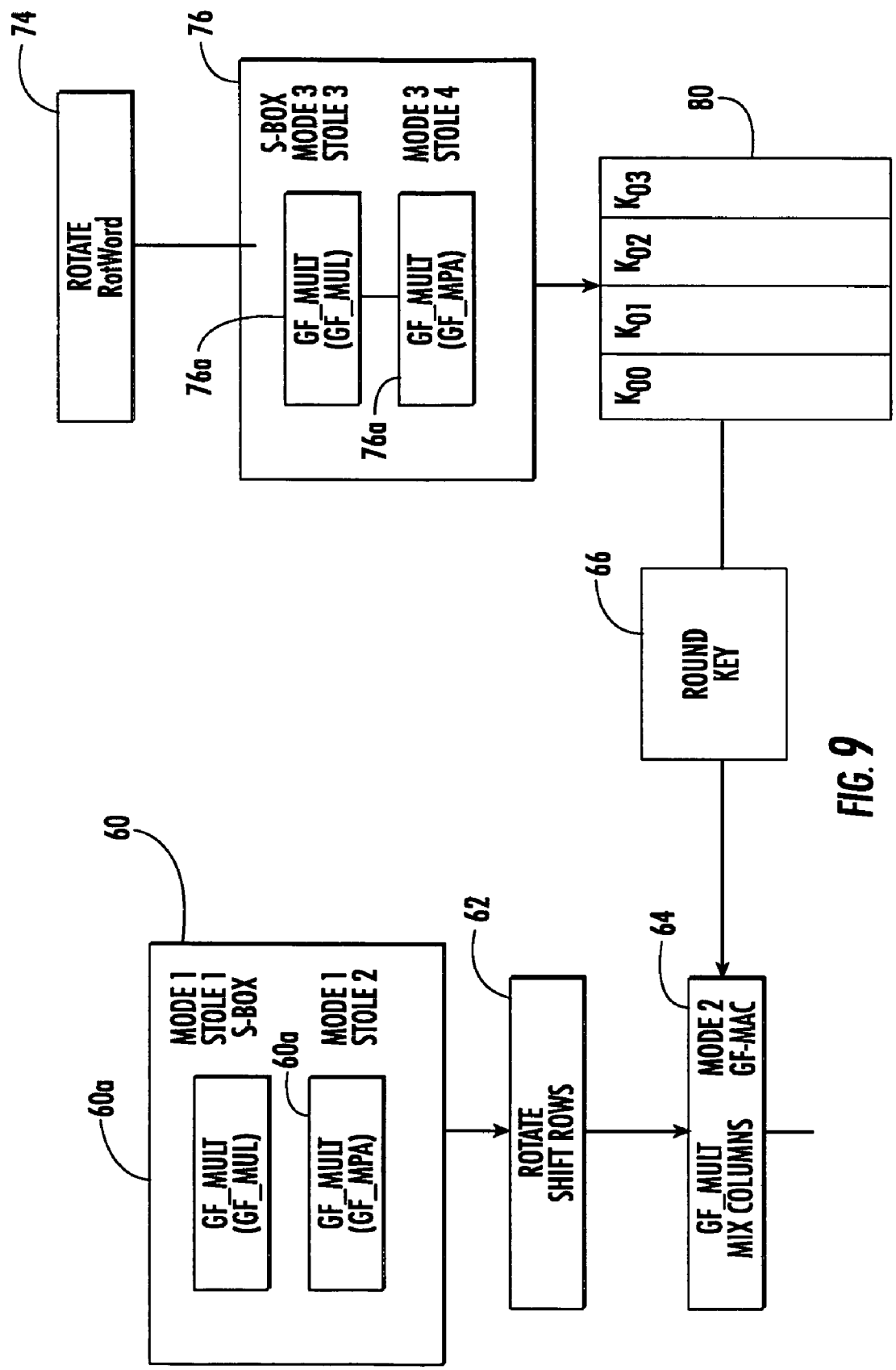
FIG. 9 is a schematic view of a system using a separate Galois field multiplier for each operation.

Alternatively, FIG. 9, each function could be served by its own dedicated Galois field multiplier. Galois field multiplier 60a could perform multiplication for mode 1, state 1. Galois field multiplier 60aa could perform multiply and add for mode 1, state 2. Galois field multiplier 64 could perform multiply-accumulate for mode 2, Galois field multiplier 76a could perform multiplication for mode 3, state 3 and Galois field multiplier 76aa could perform multiply and add for mode 3, state 4.

Figure 10:
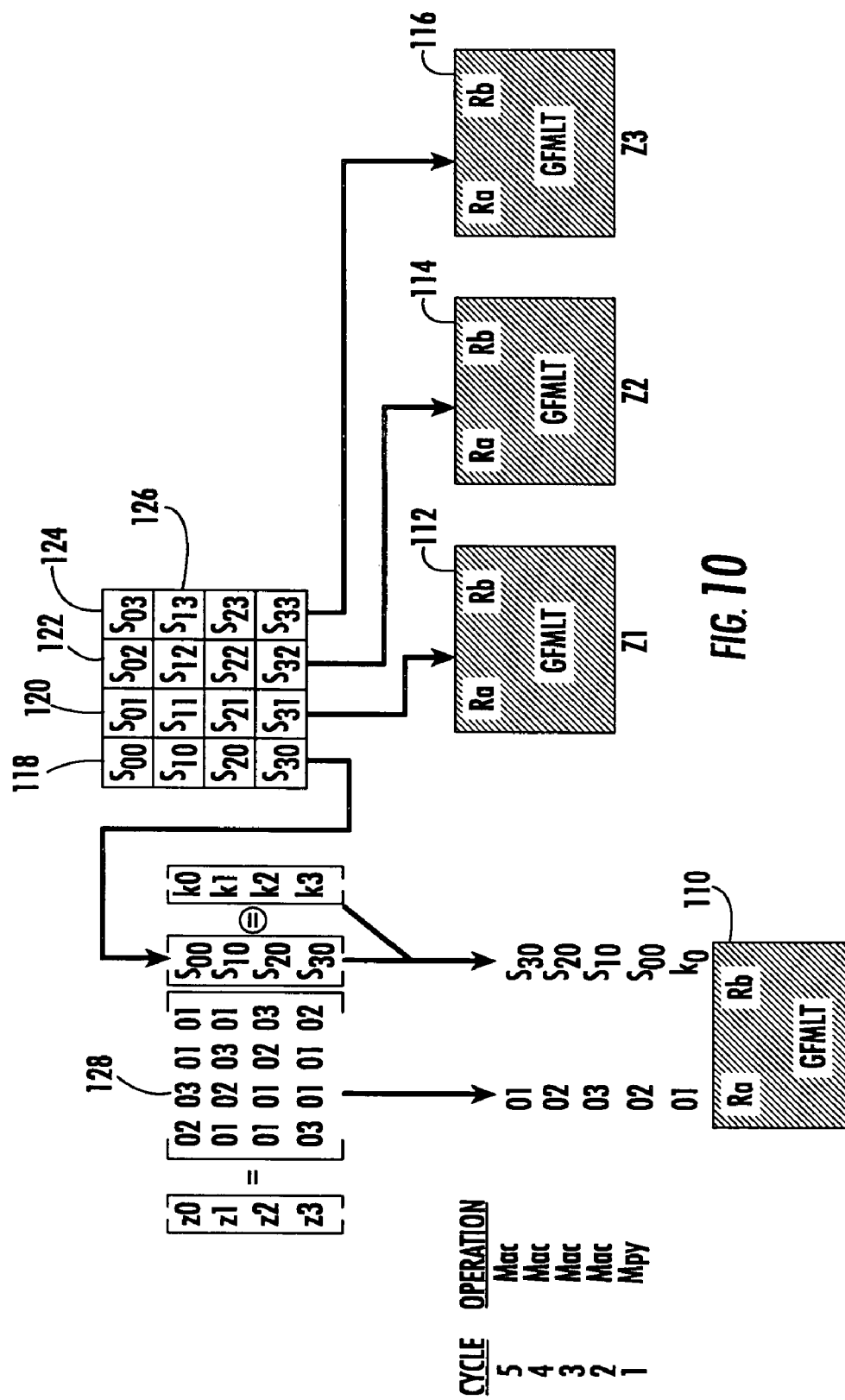
FIG. 10 is a more detailed schematic block diagram of the mix column Galois field multiplier of FIG. 6.

Alternatively, a quad (four) Galois Field Multiplier system (GFMLT) 110, 112, 114 and 116, FIG. 10, can be used as a Single Instruction Multiple Data (SIMD) array so that each one processes one byte to calculate in $m^{-1}$ cycles the S-Boxes of a four-byte 32 bit word.

The Galois field multiplier system may include a polynomial multiplier circuit for multiplying two polynomials with coefficients over a Galois field to obtain their product; a Galois field linear transformer responsive to the polynomial multiplier circuit for predicting the modulo remainder of the polynomial product for an irreducible polynomial; a storage circuit for supplying to the Galois field linear transformer a set of coefficients for predicting the modulo remainder for a predetermined irreducible polynomial; and a Galois field adder circuit for adding the product of the multiplier circuit with the output of the Galois field linear transformer circuit to obtain Galois field multiply-accumulate function of the input polynomials in one cycle.

Figure 11:
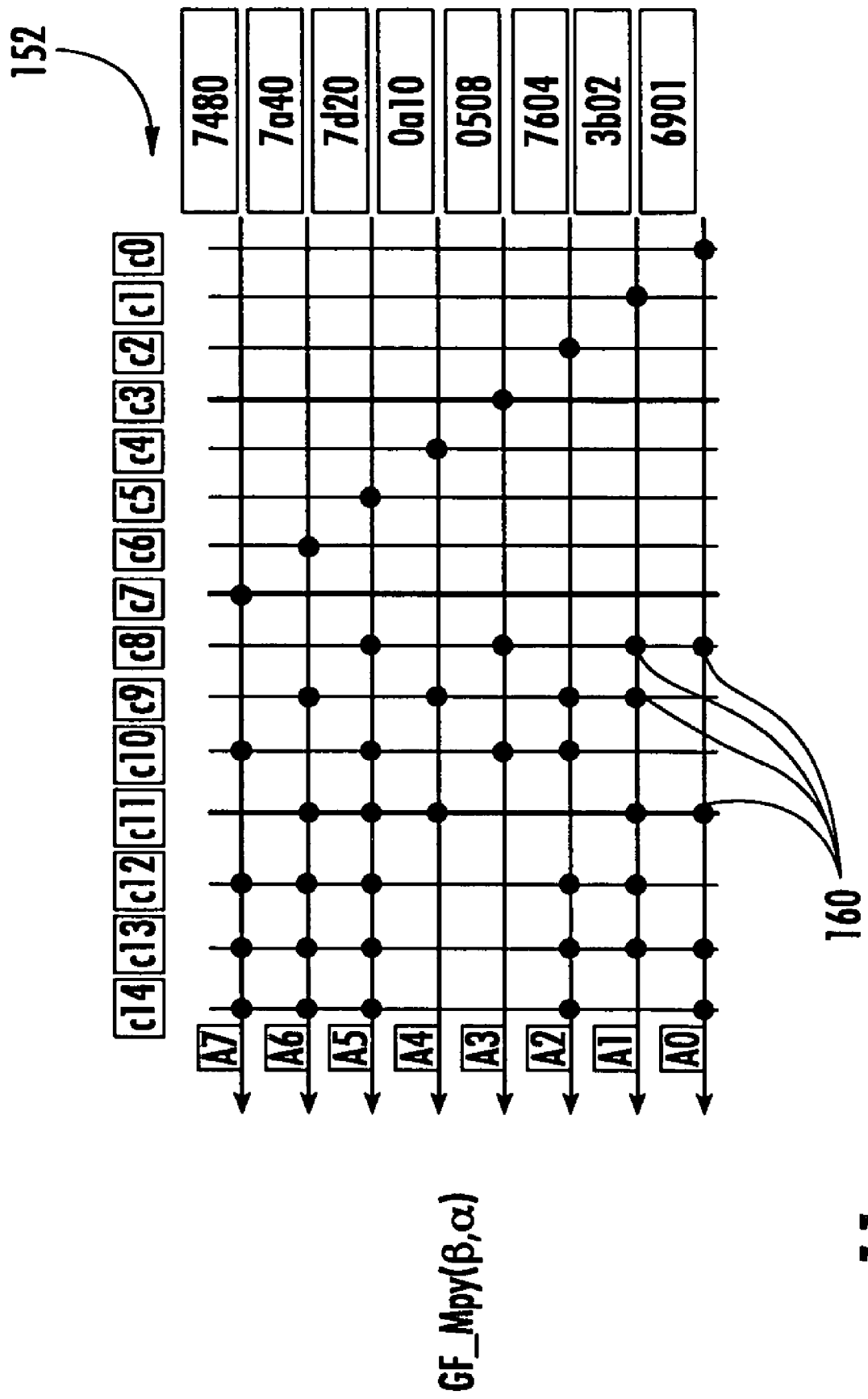
FIGS. 11, 13, 14 and 15 illustrate different configurations of the engine of FIG. 12 to perform different operations.

Mix column Galois field multiplier 64, FIG. 9, may be implemented using the same quad SIMD Galois field multiplier array, so that each one processes a column 118, 120, 122, 124, FIG. 10, of data block 126 and the entire data block can be processed at once. Each Galois field multiplier linear transformer 110-116, includes two registers, $R_a$ and $R_b$, all four operate the same so the discussion of Galois field linear transformer 110 will suffice to explain the operation of all four. Galois field multiplier linear transformer 110 is shown operating over five cycles, identified as cycles 1, 2, 3, 4 and 5. In cycle 1 a multiply by 1 operation is accomplished whereas in cycles 2, 3, 4 and 5, multiply accumulation operations occur. Register $R_a$ receives the mix column transformation matrix 128. Register $R_b$ receives the key $K_0$ on the first cycle followed by the bytes in column 118. In the first cycle the key $K_0$ is multiplied by 01, on the second cycle the value in the first position in matrix 128 is multiplied by the value of $S_{00}$ in column 118 and accumulated to the key $K_0$ form the previous Galois field multiplier output. In the next cycle the next value 03 from matrix 128 is multiplied by the next value $S_{10}$ in column 118 and added to the previous Galois field multiplier output to complete the multiply accumulate operation. The next two cycles perform similar operations with the next two values in the matrix and the next two values in the column. The final output is shown as $$Z_0 = (k_0 \oplus 01) \oplus (02 \otimes S_{00}) \oplus (03 \otimes S_{10}) \oplus (01 \otimes S_{20}) \oplus (01 \otimes S_{30})$$

Where $\oplus$=Galois field add and $\otimes$=Galois field multiplication transformation. Each of the Galois field multiplication linear transformers 110-116 is programmed as shown in FIG. 11 where circles 160 indicate connections to enabled exclusive OR gates. This programming effects the AES Galois field GF($2^8$) multiplier using the irreducible polynomial 0x12b ($x^8 + x^5 + x^3 + x + 1$).

Before further explanation a brief discussion of the properties and operations of Galois field multiplication and addition follows.

A Galois field GF(n) is a set of elements on which two binary operations can be performed. Addition and multiplication must satisfy the commutative, associative and distributive laws. A field with a finite number of elements is a finite field. An example of a binary field is the set {0,1} under modulo 2 addition and modulo 2 multiplication and is denoted GF(2). The modulo 2 addition and multiplication operations are defined by the tables shown in the following figure. The first row and the first column indicate the inputs to the Galois field adder and multiplier. For e.g. 1+1=0 and 1*1=1.

| Modulo 2 Addition (XOR) | | |
| --- | --- | --- |
| + | 0 | 1 |
| 0 | 0 | 1 |
| 1 | 1 | 0 |

| Modulo 2 Multiplication (AND) | | |
| --- | --- | --- |
| * | 0 | 1 |
| 0 | 0 | 0 |
| 1 | 0 | 1 |

In general, if p is any prime number then it can be shown that GF(p) is a finite field with p elements and that GF($p^m$) is an extension field with $p^m$ elements. In addition, the various elements of the field can be generated as various powers of one field element, a, by raising it to different powers. For example GF(256) has 256 elements which can all be generated by raising the primitive element, α, to the 256 different powers.

In addition, polynomials whose coefficients are binary belong to GF(2). A polynomial over GF(2) of degree m is said to be irreducible if it is not divisible by any polynomial over GF(2) of degree less than m but greater than zero. The polynomial $F(X)=X^2+X+1$ is an irreducible polynomial as it is not divisible by either X or X+1. An irreducible polynomial of degree m which divides $X^{2m-1}+1$, is known as a primitive polynomial. For a given m, there may be more than one primitive polynomial. An example of a primitive polynomial for m=8, which is often used in most communication standards is $F(X)=x^8+x^4+x^3+x^2+1$ (0x11d).

Galois field addition is easy to implement in software, as it is the same as modulo addition. For example, if 29 and 16 are two elements in $GF(2^8)$ then their addition is done simply as an XOR operation as follows: 29 (11101)⊕16(10000)=13 (01101).

Galois field multiplication on the other hand is a bit more complicated as shown by the following example, which computes all the elements of $GF(2^4)$, by repeated multiplication of the primitive element α To generate the field elements for $GF(2^4)$ a primitive polynomial G(x) of degree m=4 is chosen as follows $G(x)=X^4=X+1$. In order to make the multiplication be modulo so that the results of the multiplication are still elements of the field, any element that has the fifth bit set is brought into a 4-bit result using the following identity $F(α)=α^4+α+1=0$. This identity is used repeatedly to form the different elements of the field, by setting $α^4=1+α$. Thus the elements of the field can be enumerated as follows:

$$\{0, 1, α, α^2, α^3, 1+α, α+α^2, α^2+α^3, 1+α+α^3, \ldots 1+α^3\}$$

since α is the primitive element for $GF(2^4)$ it can be set to 2 to generate the field elements of $GF(2^4)$ as {0, 1, 2, 4, 8, 3, 6, 12, 11 . . . 9}.

It can be seen that Galois field polynomial multiplication can be implemented in two basic steps. The first is a calculation of the polynomial product $c(x)=a(x)*b(x)$ which is algebraically expanded, and like powers are collected (addition corresponds to an XOR operation between the corresponding terms) to give c(x).

For example $c(x)=(a_3x^3+a_2x^2+a_1x^1+a_0)*(b_3x^3+b_2x^3+b_1x^1+b_0)$ $C(x)=c_6x^6+c_5x^5+c_4x^4+c_3x^3+c_2x^2+c_1x^1+c_0$ where:

Chart II
$c_0=a_0*b_0$
$c_1=a_1*b_0 \oplus a_0*b_1$
$c_2=a_2*b_0 \oplus a_1*b_1 \oplus a_0*b_2$
$c_3=a_3*b_0 \oplus a_2*b_1 \oplus a_1*b_2 \oplus a_0*b_3$
$c_4=a_3*b_1 \oplus a_2*b_2 \oplus a_1*b_3$
$c_5=a_3*b_2 \oplus a_2*b_3$
$c_6=a_3*b_3$ The second is the calculation of $d(x)=c(x)$ modulo $p(x)$ where p(x) is an irreducible polynomial.

To illustrate, multiplications are performed with the multiplication of polynomials modulo an irreducible polynomial. For example: (if $p(x)=x^8+x^4+x^3+x+1$)

{57}*{83}={c1} because,

Each of these {*} bytes is the concatenation of its individual bit values (0 or 1) in the order {b7, b6, b5, b4, b3, b2, b1, b0} and are interpreted as finite elements using polynomial representation:

$$b_7x^7+b_6x^6+b_5x^5+b_4x^4+b_3x^3+b_2x^2+b_1x^1+b_0x^0=\Sigma b_ix^i$$

First Step $$(x^6 + x^4 + x^2x + 1)(x^7 + x + 1) =$$
$$x^{13} \oplus x^{11} \oplus x^9 \oplus x^8 \oplus x^7 \oplus x^7 \oplus x^5 \quad \oplus x^3 \oplus x^2 \oplus x\,x^6 \oplus x^4 \oplus x^2 \oplus x \oplus x =$$
$$x^{13} \oplus x^{11} \oplus x^9 \oplus x^8 \oplus x^6 \oplus x^5 \oplus x^4 \oplus x^3 \oplus 1$$

Second Step $$x^{13} + x^{11} + x^9 + x^8 + x^6 + x^5x^4 +$$
$$x^3 + 1 \quad \text{modulo}(x^8 + x^4 + x^3 + x + 1) = x^7 + x^6 + 1$$

A Galois field multiplier system includes a binary polynomial multiplier circuit for multiplying two binary polynomials in a register with the polynomials in another register to obtain their product is given by the sixteen-term polynomial c(x) defined as chart III. A multiplier circuit actually includes a plurality of multiplier cells.

Chart III
c14=a7*b7
c13=a7*b6⊕a6*b7
c12=a7*b5⊕a6*b6⊕a5*b7
c11=a7*b4⊕a6*b5⊕a5*b6⊕a4*b7
c10=a7*b3⊕a6*b4⊕a5*b5⊕a4*b6⊕a3*b7
c9=a7*b2⊕a6*b3⊕a5*b4⊕a4*b5⊕a3*b6⊕a2*b7
c8=a7*b1⊕a6*b2⊕a5*b3⊕a4*b4⊕a3*b5⊕a2*b6⊕a1*b7
c7=a7&b0⊕a6*b1⊕a5*b2⊕a4*b3⊕a3*b4⊕a2*b5⊕a1*b6⊕a0*n7
c6=a6*b0⊕a5*b1⊕a4*b2⊕a3*b3⊕a2*b4⊕a1*b5⊕a0*b6
c5=a5*b0⊕a4*b1⊕a3*b2⊕a2*b3⊕a1*b4⊕a0*b5
c4=a4*b0⊕a3*b1⊕a2*b2⊕a1*b3⊕a0*b4
c3=a3*b0⊕a2*b1⊕a1*b2⊕a0*b3
c2=a2*b0=a1*b1⊕a0*b2
c1=a1*b0⊕a0*b1
c0=a0*b0

Each term includes an AND function as represented by an * and each pair of terms are combined with a logical exclusive OR as indicated by a ⊕. This product is submitted to a Galois field linear transformer circuit which may include a number of Galois field linear transformer units each composed of e.g. 16×8 cells, which respond to the product produced by the multiplier circuit to predict in one cycle the modulo remainder of the polynomial product for a predetermined irreducible polynomial. The construction and operation of this Galois field linear transformer circuit and each of its transformer units and its multiplier function is explained more fully in U.S. Patent application GALOIS FIELD LINEAR TRANSFORMER, Stein et al., Ser. No. 10/051,533, filed Jan. 18, 2002 (AD-239J) and GALOIS FIELD MULTIPLIER SYSTEM, Stein et al., Ser. No. 60/334,510, filed Nov. 30, 2001 (AD-240J) each of which is incorporated herein in its entirety by this reference. Each of the Galois field linear transformer units predicts in one cycle the modulo remainder by dividing the polynomial product by an irreducible polynomial. That irreducible polynomial may be, for example, anyone of those shown in Chart IV.

Chart IV
$GF(2^1)$
0x3 (x+1)
$GF(2^2)$
0x7 $x^2+x+1$)
$GF(2^3)$

0xB ($x^3+x+1$)
0xD ($x^3+x^2+1$)
GF($2^4$)
0x13 ($x^4+x+1$)
0x19 ($x^4+x^3+1$)
GF($2^5$)
0x25 ($x^5+x^2+1$)
0x29 ($x^5+x^3+1$)
0x2F ($x^5+x^3+x^2+x+1$)
0x37 ($x^5+x^4+x^2+x+1$)
0x3B ($x^5+x^4+x^3+x+1$)
0x3D ($x^5+x^4+x^3+x^2+1$)
GF($2^6$)
0x43 ($x^6+x+1$)
0x5B ($x^6+x^4+x^3+x+1$)
0x61 ($x^6+x^5+1$)
0x67 ($x^6+x^5+x^2+x+1$)
0x6D ($x^6+x^5+x^3+x^2+1$)
0x73 ($x^6+x^5+x^4+x+1$)
GF($2^7$)
0x83 ($x^7+x+1$)
0x89 ($x^7+x^3+1$)
0x8F ($x^7+x^3+x^2+x+1$)
0x91 ($x^7+x^4+1$)
0x9D ($x^7+x^4+x^3+x^2+1$)
0xA7 ($x^7+x^5+x^2+x+1$)
0xAB ($x^7+x^5+x^3+x+1$)
0xB9 ($x^7+x^5+x^4+x^3+1$)
0xBF ($x^7+x^5+x^4+x^3+x^2+x+1$)
0xC1 ($x^7+x^6+1$)
0xCB ($x^7+x^6+x^3+x+1$)
0xD3 ($x^7+x^6+x^4+x+1$)
0xE5 ($x^7+x^6+x^5+x^2+1$)
0xF1 ($x^7+x^6+x^5+x^4+1$)
0xF7 ($x^7+x^6+x^5+x^4+x^2+x+1$)
0xFD ($x^7+x^6+x^5+x^4+x^3+x^2+1$)
GF($2^8$)
0x11D ($x^8+x^4+x^3+x^2+1$)
0x12B ($x^8+x^5+x^3+x+1$)
0x12D ($x^8+x^5+x^3+x^2+1$)
0x14D ($x^8+x^6+x^3+x^2+1$)
0x15F ($x^8+x^6+x^4+x^3+x^2+x+1$)
0x163 ($x^8+x^6+x^5+x+1$)
0x165 ($x^8+x^6+x^5+x^2+1$)
0x169 ($x^8+x^6+x^5+x^3+1$)
0x171 ($x^8+x^6+x^5+x^4+1$)
0x187 ($x^8+x^7+x^2+x+1$)
0x18D ($x^8+x^7+x^3+x^2+1$)
0x1A9 ($x^8+x^7+x^5+x^3+1$)
0x1C3 ($x^8+x^7+x^6+x+1$)
0x1CF ($x^8+x^7+x^6+x+1$)
0x1E7 ($x^8+x^7+x^6+x^5+x^2+x+1$)
0x1F5 ($x^8+x^7+x^5+x^4+x^8+1$)

The Galois field multiplier presented where GF($2^8$) is capable of performing with all powers $2^8$ and under is shown in Chart IV. For lower polynomials the coefficients at higher than the chosen power will be zeros, e.g., if GF($2^5$) is implemented coefficients between GF($2^5$) and GF($2^8$) will be zero. Then the prediction won't be made above that level.

An example of the GF multiplication according to this invention occurs as follows:

Before GF( ) multiplication

Polynomial 0×11d 45 23 00 01h
GF()
57 34 00 01h
xx xx xx xxh

After GF8() multiplication

Polynomial 0×11d 45 23 00 01h
GF( )
57 34 00 01h
72 92 00 01h

Figure 12:
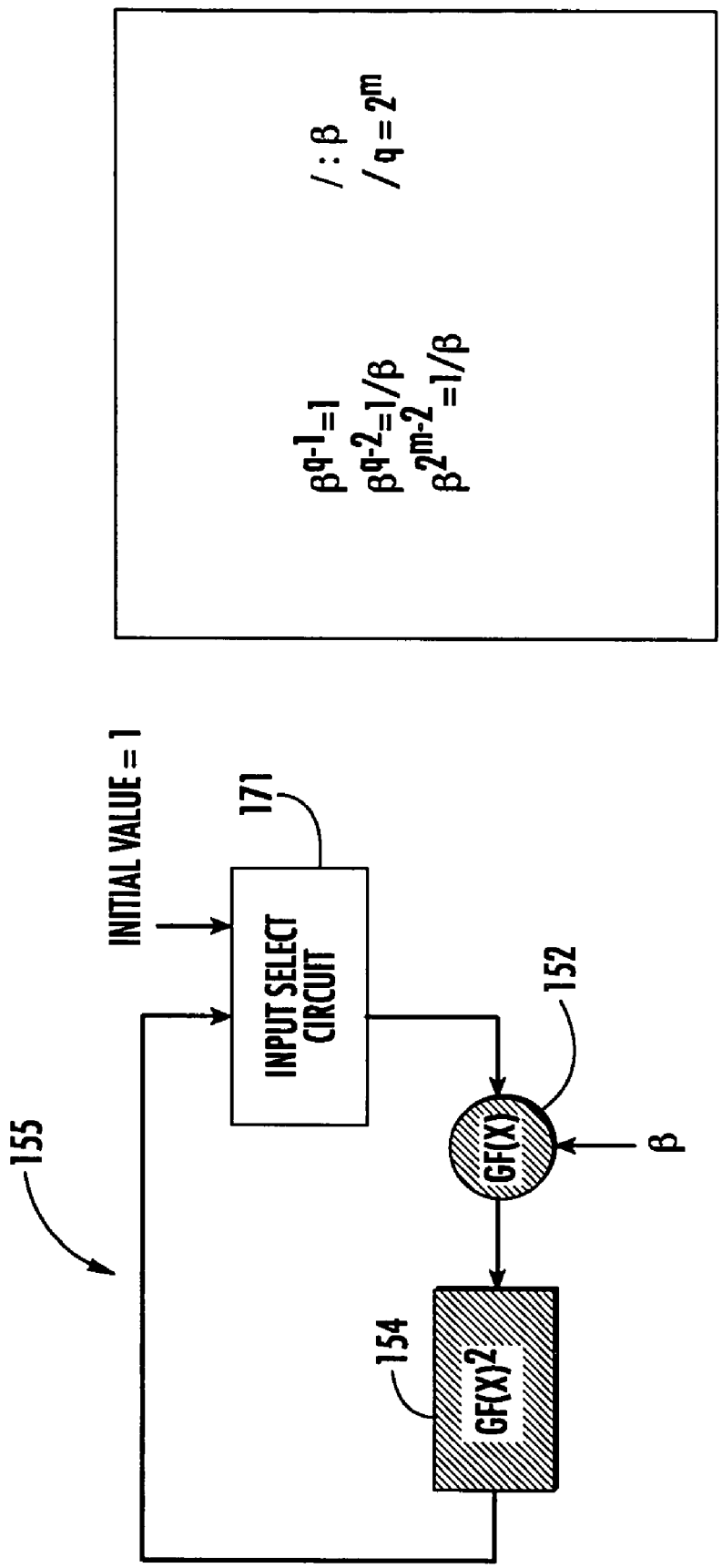
FIG. 12 is a schematic view of a Galois field reciprocal generator according to this invention.

There is shown in FIG. 12 a Galois field reciprocal generator 155 having a Galois field multiplier 152 and a second Galois field multiplier 154 for performing a squaring function. Galois field reciprocal generator 155 generates 1/β where β is an element of a Galois field, for example, where m=8, that is GF($2^8$): the degree of the field is eight. Initially Galois field multiplier 152 receives a 1 and β and multiplies them together. The output is then squared in Galois field multiplier 154 and fed back to Galois field multiplier 152. This result is multiplied by β and squared over and over again for m−2 times so that after m−1 iterations the reciprocal 1/β is obtained. The timely application of "1" and the Galois Field squarer 154 output is performed by input selection circuit 171.

The fact that $$\beta^{2^{m-2}} = \frac{1}{\beta}$$

is shown by the following exposition, given:

the field of GF(q) is made up from the numbers {0, 1 . . . (q−1)}. If we multiply by β (β is a field member ≠0) each member of {1, 2 . . . (q−1)} to get {1β, 2β . . . (q−1)β} we can easily see that we get the same set back again (with the order changed). This means that 1, ·2· . . . ·(q−1)=1β·2β·. . . ·(q−1)β=1·2·. . . ·(q−1)β$^{q-1}$ by cancelling the factors 1·2·. . . ·(q−1) from both sides assures us that $\beta^{q-1}=1$         (1)

Therefore $\beta^{-1}=\beta^{q-2}$         (2)

Replacing q with $2^m$ results in the expression $$\beta^{2^{m-2}} = \frac{1}{\beta} \quad (3)$$

FIG. 12 is a straightforward implementation of this expression.

According to (3) for m=8 we need to calculate $\beta^{254}$. $\beta^{254}$ can be calculated as $\beta^{128} \cdot \beta^{64} \cdot \beta^{32} \cdot \beta^{16} \cdot \beta^{8} \cdot \beta^{4} \cdot \beta^{2}$. Which can be iteratively calculated as $n = 1: (\beta \cdot 1)^2 = \beta^2$ $n = 2: (\beta^2 \cdot \beta)^2 = \beta^4 \cdot \beta^2 = \beta^6$ -continued $$n = 3: (\beta^4 \cdot \beta^2 \cdot \beta)^2 = \beta^8 \cdot \beta^4 \cdot \beta^2 = \beta^{14}$$

$$\vdots$$

$$n = 7: (\beta^{64} \cdot \beta^{32} \cdot \beta^{16} \cdot \beta^8 \cdot \beta^4 \cdot \beta^2 \cdot \beta \cdot)^2 =$$

$$\beta^{128} \cdot \beta^{64} \cdot \beta^{32} \cdot \beta^{16} \cdot \beta^8 \cdot \beta^4 \cdot \beta^2 = \beta^{254}$$

The circuit of FIG. 10 starts from an initial value of 1 and generates at the following successive values:

| | Iteration # | | | | | | |
|---|---|---|---|---|---|---|---|
| | 1 | 2 | 3 | 4 | 5 | 6 | 7 |
| Value at Point 155 | $\beta^2$ | $\beta^6$ | $\beta^{14}$ | $\beta^{30}$ | $B^{62}$ | $\beta^{126}$ | $B^{254}$ |

As can be seen, the final value of $\beta^{-1}$ is obtained in n=(m−1) cycles. The same circuit is generating $\beta^{-1}$ for all intermediate powers of m GF($2^m$) {m=3 . . . 7}, for example if m=4, $\beta^{2^m-2}$=14 is generated at n=(m−1)=3.

Figure 13:
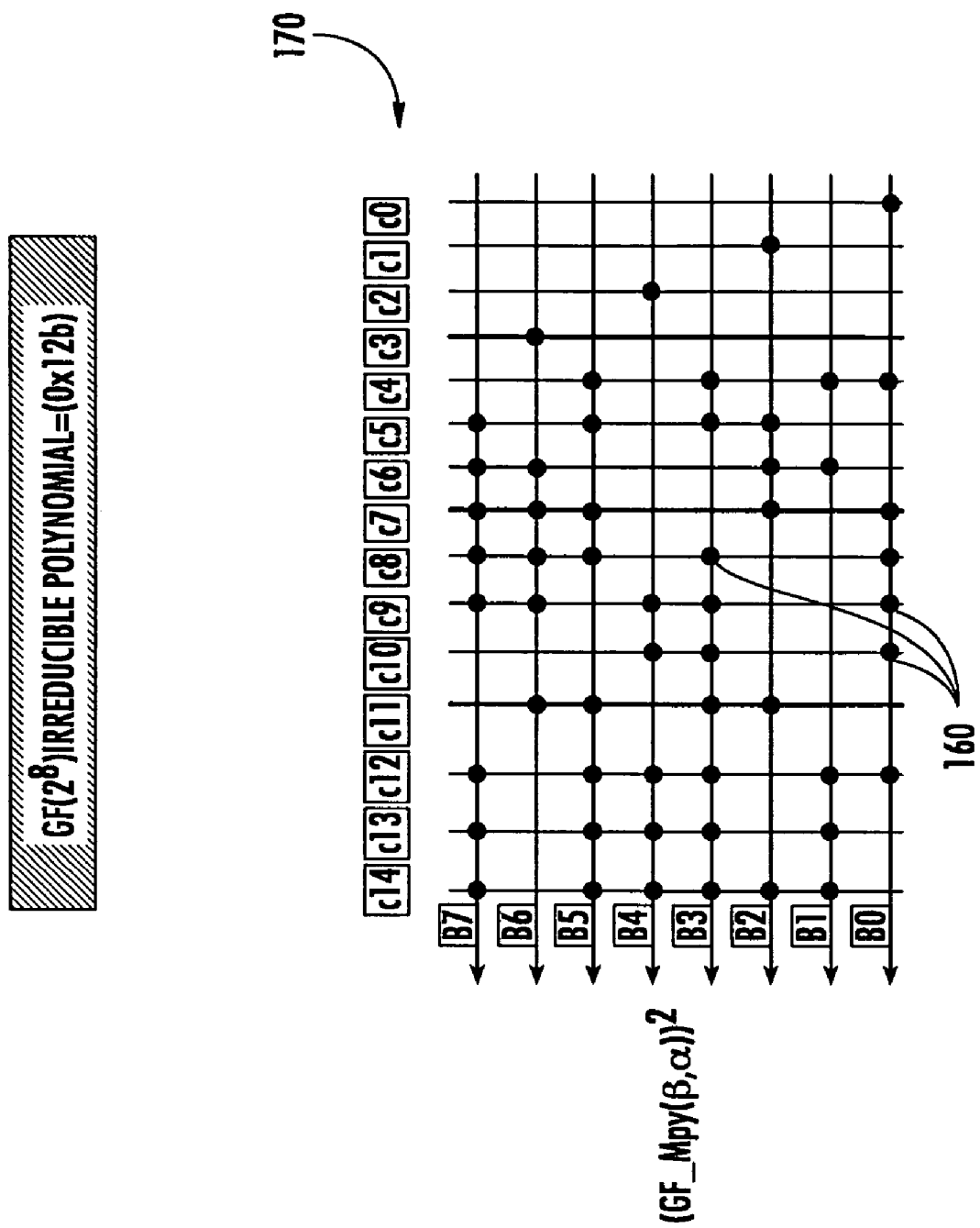
Figure 14:
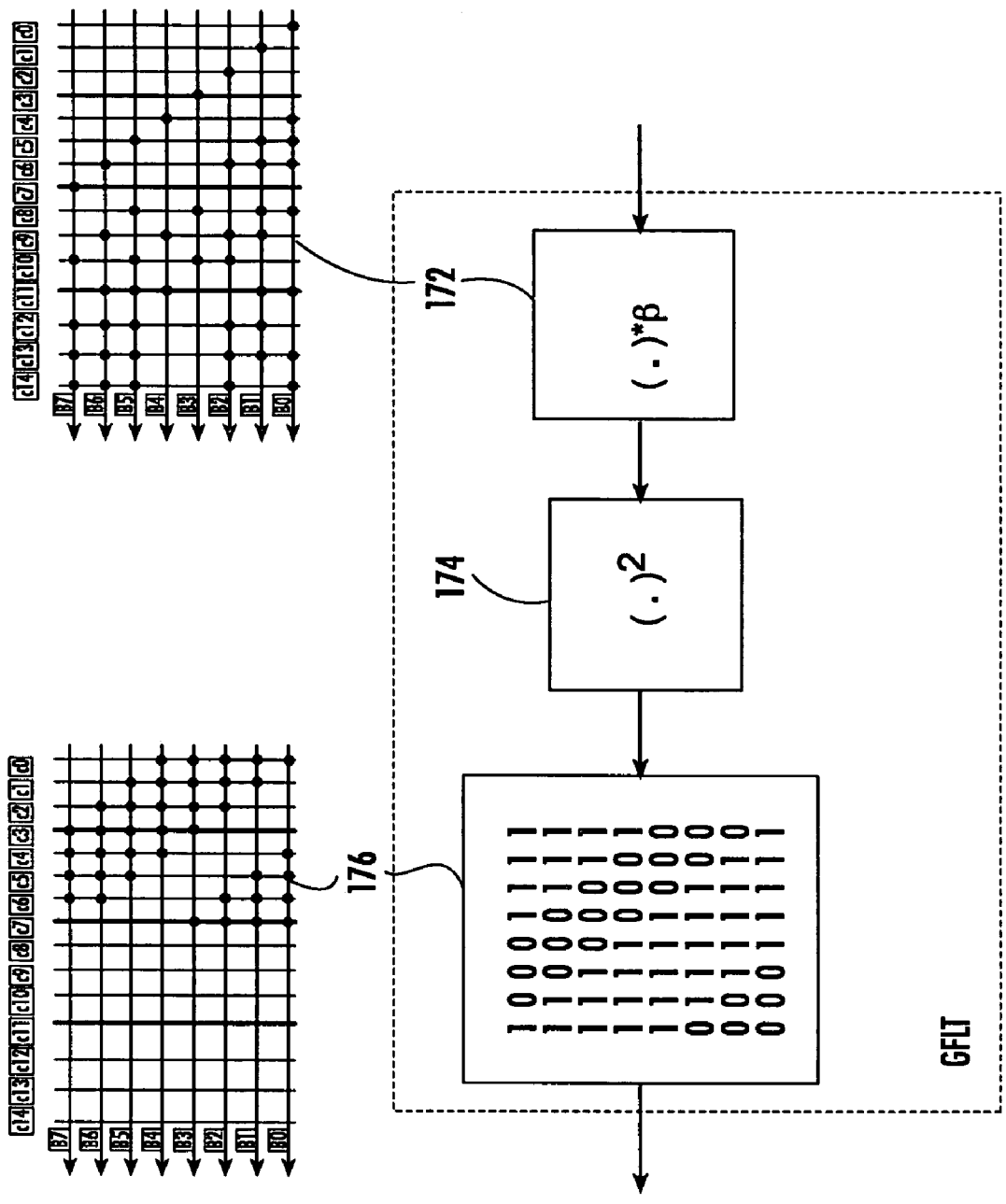
Figure 15:
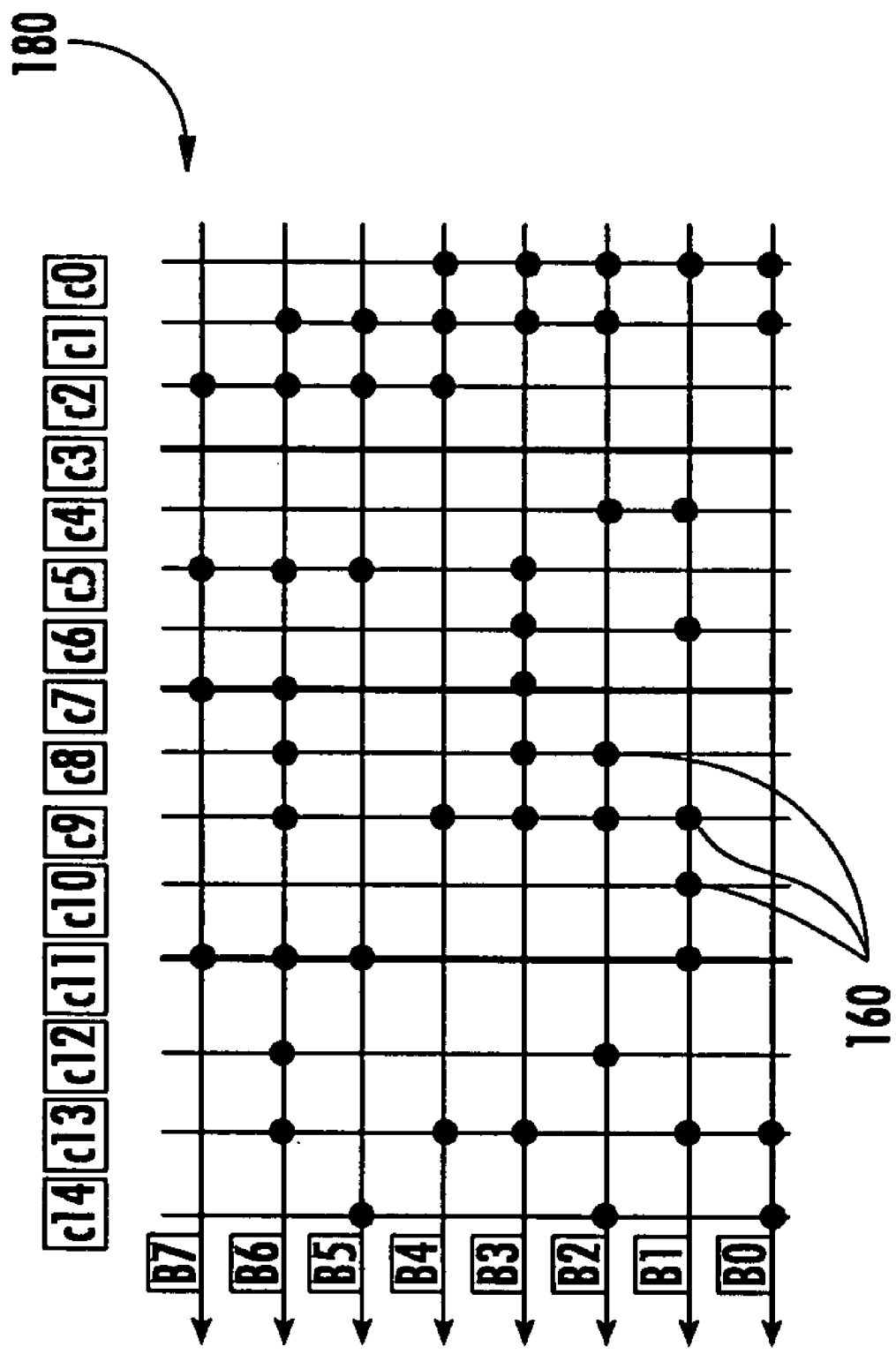
Figure 16:
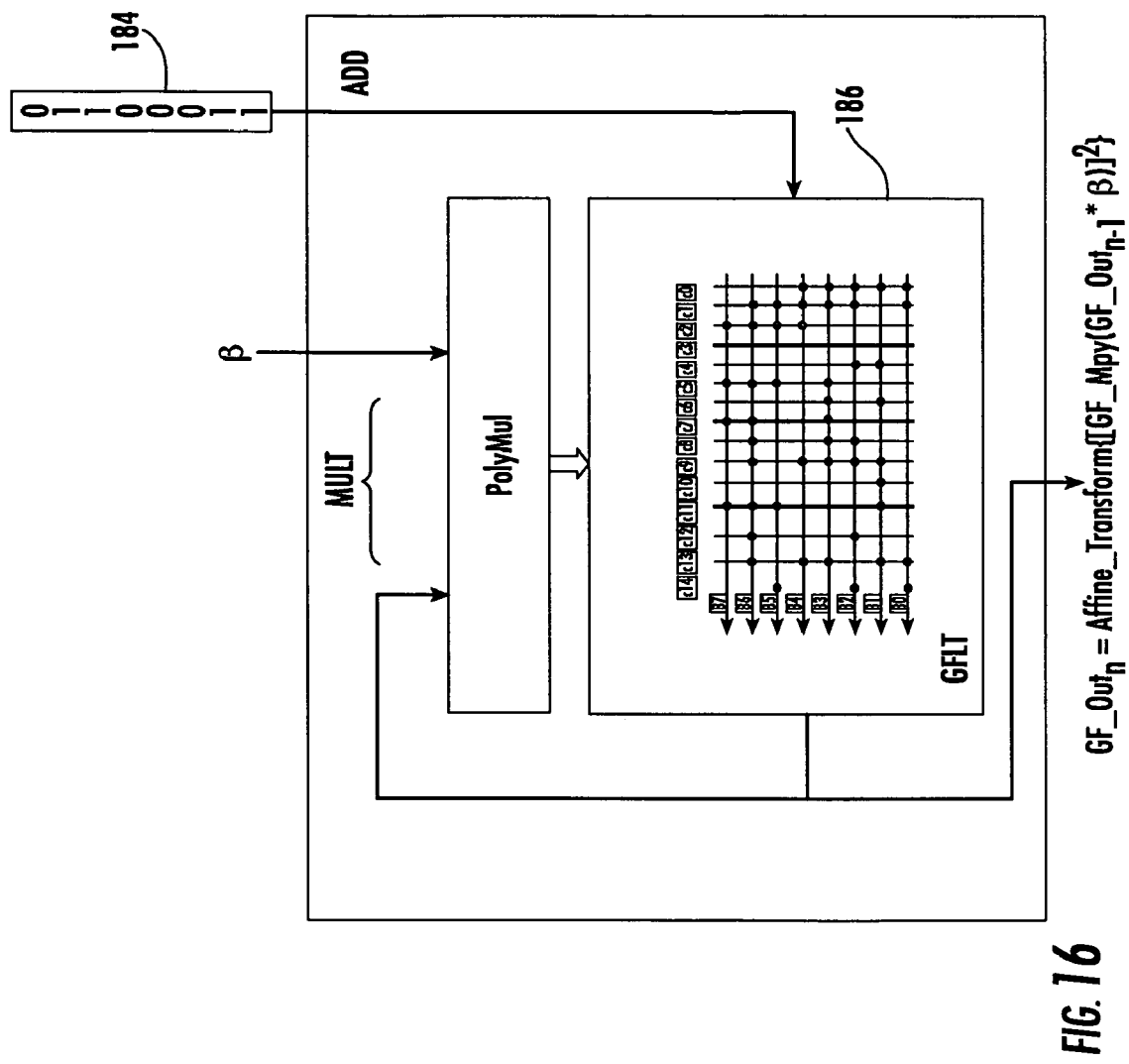
FIG. 16 is a schematic view of the last iteration of S-Box generation according to this invention.
Figure 17:
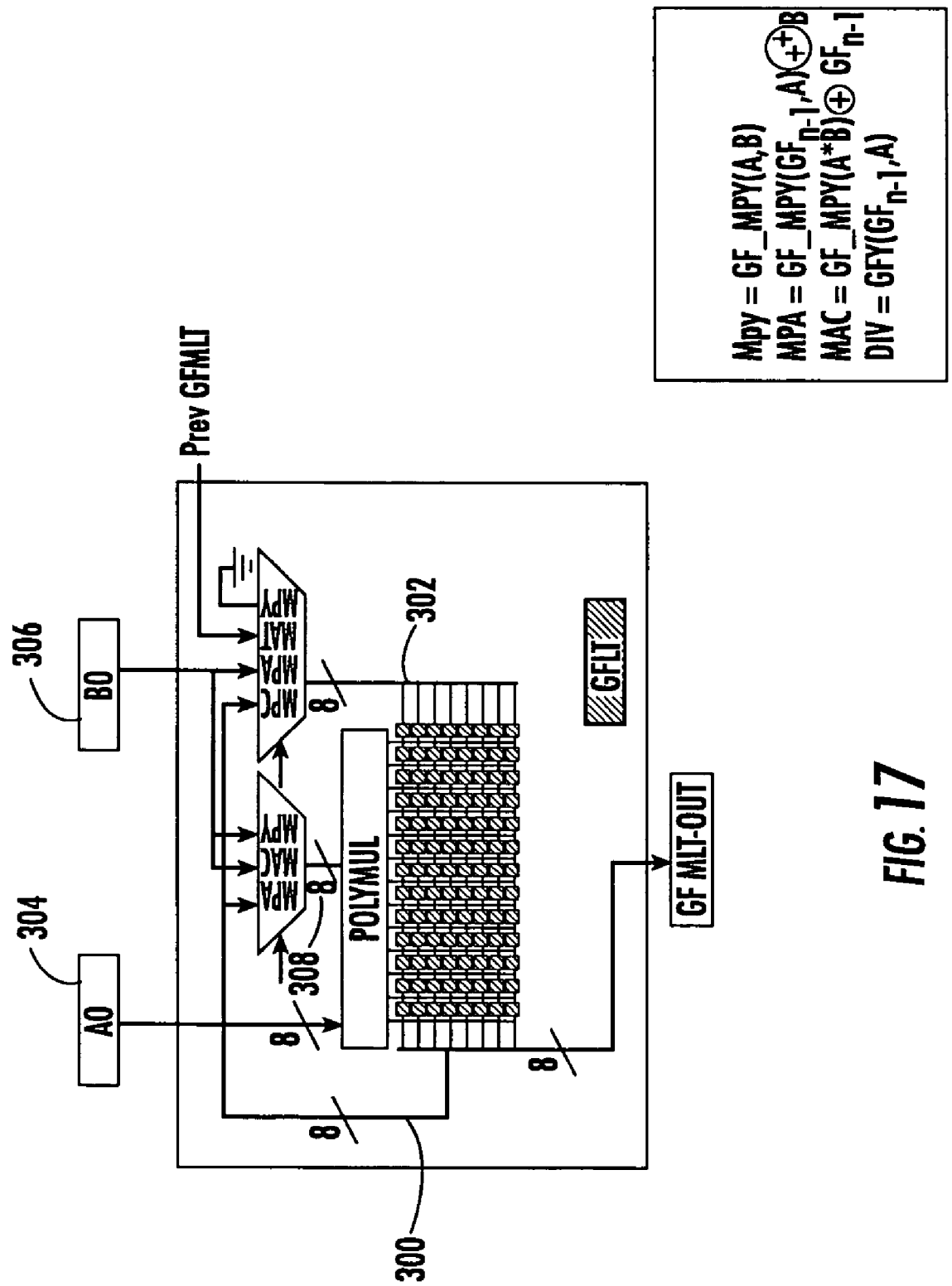
FIG. 17 is a diagram of the Galois field multiply/multiply-add/multiply-accumulate system according to this invention.

The simple Galois field multiplication (β,δ) using the irreducible or primitive polynomial 0x12b in group GF($2^8$) can be achieved by configuring multiplier 152 as shown in FIG. 11, where the programming circuit has enabled the cells 160 at the positions shown by shaded circles, while the multiply-square function [GF_MPY(β,δ)]$^2$ can be achieved with the compound configuration of Galois field multiplier 170 in FIG. 13. The compounding of the Galois field multiplier can be extended even further to include the multiply by β operation 172, FIG. 14, square operation 174 and the matrix multiply part of the affine transform 176 by programming the Galois field multiplier linear transformer 186 to enable cells 160 as shown in 180, FIG. 15 and using the multiplier in Multiply and add mode to add the additive part 184 of the affine transform FIG. 16. The Galois field multiplier system would include a polynomial multiplier circuit for multiplying two polynomials with coefficients over a Galois field to obtain their product; a Galois field linear transformer responsive to the polynomial multiplier circuit for predicting the modulo remainder of the polynomial product for an irreducible polynomial; a storage circuit for supplying to the Galois field linear transformer a set of coefficients for predicting the modulo remainder for a predetermined irreducible polynomial; and a Galois field adder circuit for adding the product of the multiplier circuit with a third polynomial with coefficients over a Galois field for performing one of Galois field (Multiply, Multiply-Add or Multiply-Accumulate) function of the input polynomials in one cycle. In FIG. 17, if the Galois multiplier is set to multiply mode the two input registers circuit 304 and 306 are multiplied while an additive identity polynomial is supplied at the add input 302. If the Galois multiplier is set to MAC mode the output of the Galois field multiplier output 300 is recursively feed back at add input 302 while two new values are passed to input registers circuit 304 and 306 and a Multiply and accumulate (MAC) is performed. If the Galois multiplier is set to MPA mode the output of the Galois field multiplier 300 is recursively feed back at input 308 and multiplied by the value passed to input register 304 while the value passed to input register 306 is added at input 302 and a Multiply and add (MPA) is performed. In this way the entire multiplication and addition of the Galois field multiplier output 300 with the polynomials in registers 304 and 306 is all accomplished in one cycle of operation.

Figure 18:
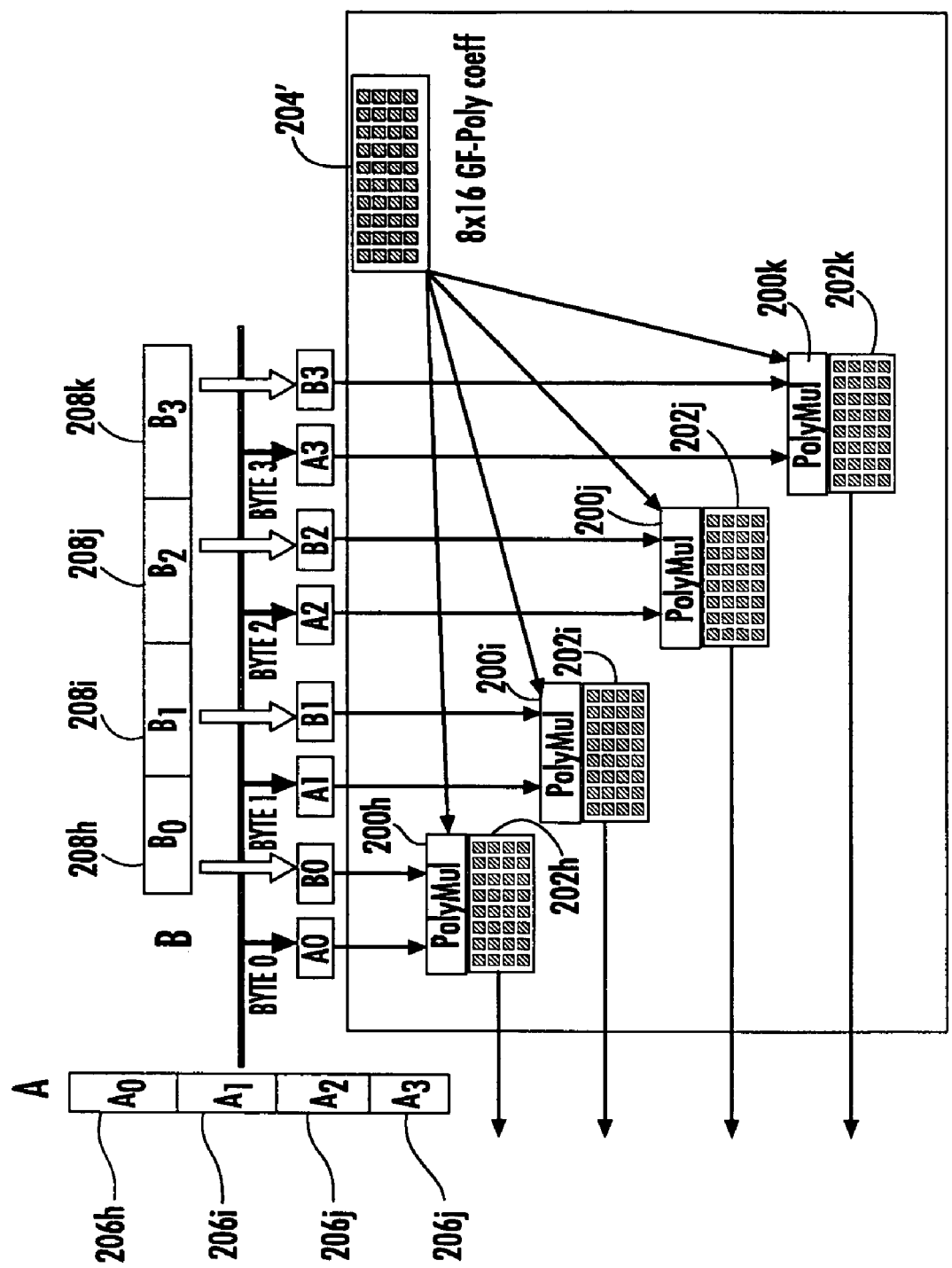
FIG. 18 is a schematic view of quad Single Instruction Multiple Data (SIMD) Galois field system.

Although thus far the invention has been explained for the sake of simplicity with respect to only one engine, a number of the engines may be employed together as shown in FIG. 18 where each engine has a multiplier circuit 200h, 200i, 200j, 200k and a Galois field linear transformer 202h, 202i, 202j, 202k circuit. With a single central reconfigurable control circuit 204 controlling them all. These engines when working as a Single Instruction Multiple Data (SIMD) array can share the same wide [32, 64, 128] bit A and B registers where each operates on a different 8 bit (Byte) segment, or each can be serviced by its own reconfigurable control unit 204h, 204i, 204j, 204k and each by its own pair of A and B registers $A_0$, and $B_0$ 206h, and 208h; $A_1$ and, $B_1$, 206i, and 208i; $A_2$ and $B_2$, 206j and 206j, $A_3$ and $B_3$ 206k and 208k and so on.

The Galois field multiplier system is explained in U.S. patent application Ser. No. 10/228,526 filed Aug. 26, 2002 to Stein et al., entitled GALOIS FIELD MULTIPLY/MULTIPLY-ADD/MULTIPLY ACCUMULATE (AD-299J); and U.S. patent application Ser. No. 10/136,170, filed May 1, 2002 to Stein et al., entitled RECONFIG.URABLE INPUT GALOIS FIELD LINEAR TRANSFORMERER SYSTEM (AD-300J) and U.S. patent application Ser. No. 10/395,620 filed Mar. 24, 2003 to Stein et al., entitled COMPACT GALOIS FIELD MULTIPLIER ENGINE (AD-337J); incorporated herein in its entirety by this reference.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An advanced encryption standard (AES) engine with real time S-box generation comprising:
    a Galois field multiplier system in a first mode responsive to a first data block for generating an AES selection (S-box) function by executing the multiplicative inverse in $GF^1$ ($2^m$) and applying an affine over GF(2) transformation to obtain a subbyte transformation; and
    a shift register system for transforming said subbyte transformation to obtain a shift row transformation;
    said Galois field multiplier system being responsive in a second mode to said shift row transformation to obtain a mix column transformation and adding a round key for generating in real time an advanced encryption standard cipher function of said first data block.

2. The advanced encryption standard (AiES) engine with real time S-box generation of claim 1 in which said first mode includes two states for executing m−1 cycles of operation including a first state for multiplying a subbyte by one to obtain a product and then squaring the product to obtain an intermediate result and repeating with the intermediate result m−2 times and a second state for performing the multiply and square operations one more time and transforming the final intermediate result to obtain the subbyte transformation.

3. The advanced encryption standard (AES) engine with real time S-box generation of claim 2 in which said Galois field multiplier system includes a Galois field linear transformer for each said mode.

4. The advanced encryption standard (AES) engine with real time S-box generation of claim 2 in which said Galois field multiplier system includes a Galois field linear transformer for each state of said first mode and for said second mode.

5. The advanced encryption standard (AES) engine with real time S-box generation of claim 2 in which said Galois field multiplier system includes a Galois field linear transformer and a program circuit for reconfiguring said Galois field linear transformer for each mode.

6. The advanced encryption standard (AES) engine with real time S-box generation of claim 5 in which said program circuit further reconfigures said Galois field linear transformer for each state in said first mode.

7. The advanced encryption standard (AES) engine with real time S-box generation of claim 5 in which said program circuit configures said Galois field linear transformer to perform a compound multiply-square operation in said first state.

8. The advanced encryption standard (AES) engine with real time S-box generation of claim 5 in which said program circuit configures said Galois field linear transformer to perform a compound multiply-square operation in said first state and a compound multiply-square and affine subbyte transformation in said second state.

9. The advanced encryption standard (AES) engine with real time S-box generation of claim 3 in which said Galois field linear transformer associated with said second mode is configured as a multiplier in said first state and as multiply-accumulate in said second state to perform a mix column transformation and add a round key for generating an advanced encryption standard cipher function of said first data block.

10. The advanced encryption standard (AES) engine with real time S-box generation of claim 3 in which said Galois field linear transformer associated with said first state is configured as a multiplier to perform a compound multiply-square operation.

11. The advanced encryption standard (AES) engine with real time S-box generation of claim 3 in which said Galois field linear transformer associated with said second state is configured as a multiply-adder to perform a compound multiply-square and affine subbyte transformation.

12. The advanced encryption standard (AES) engine with real time S-box generation of claim 1 in which said Galois field multiplier system includes at least one Galois field linear transformer and an associated polynomial multiplier.

13. The advanced encryption standard (AES) engine with real time S-box generation of claim 1 in which said Galois field multiplier system includes a reconfigurable matrix of cells.

14. The advanced encryption standard (AES) engine with real time S-box generation of claim 1 further including a key generator for providing a plurality of round keys.

15. The advanced encryption standard (AES) engine with real time S-box generation of claim 14 in which said key generator includes a key generator circuit responsive to a master key to generate said round keys.

16. The advanced encryption standard (AES) engine with real time S-box generation of claim 15 in which said key generator circuit includes said Galois field multiplier system in a third mode for executing a multiplicative inverse in $GF^1(2^m)$ and applying affine over $GF(2)$ transformation to obtain said round keys.

17. The advanced encryption standard (AES) engine with real time S-box generation of claim 16 in which said round key includes a plurality of subkeys.

18. The advanced encryption standard (AES) engine with real time S-box generation of claim 17 in which said third mode includes two states for executing m−1 cycles of operation including a third state for multiplying a subkey by one to obtain a product and then squaring the product to obtain an intermediate result and repeating with the intermediate result m−2 times and a fourth state for performing the multiply and square operations one more time and transforming the final infinite result to obtain the subkey transformation.

19. The advanced encryption standard (AES) engine with real time S-box generation of claim 18 in which said Galois field multiplier system includes a Galois field transformer for each of said third and fourth states.

20. The advanced encryption standard (AES) engine with real time S-box generation of claim 19 in which said Galois field linear transformer is reconfigured by said program circuit for said third mode.

21. The advanced encryption standard (AES) engine with real time S-box generation of claim 20 in which said program circuit for further reconfigures said Galois field linear transformer for each of said third and fourth states in said third mode.

22. The advanced encryption standard (AES) engine with real time S-box generation of claim 20 in which said program circuit configures said Galois field linear transformer to perform a compound multiply-square operation in said third state.

23. The advanced encryption standard (ALES) engine with real time S-box generation of claim 20 in which said program circuit configures said Galois field linear transformer to perform a compound multiply-square operation and affine subkey transformation in said fourth state.

24. The advanced encryption standard (ALES) engine with real time S-box generation of claim 18 in which said Galois field linear transformer associated with said third state mode is configured as a multiplier to perform a compound multiply-square operation.

25. The advanced encryption standard (ALES) engine with real time S-box generation of claim 18 in which said Galois field linear transformer associated with said fourth state is configured as a multiply-adder to perform a compound multiply-square and affine subkey transformation.

26. The advanced encryption standard (ALES) engine with real time S-box generation of claim 1 in which said Galois field multiplier system includes: a polynomial multiplier circuit for multiplying two polynomials with coefficients over a Galois field to obtain their product; a Galois field linear transformer responsive to said polynomial multiplier circuit for predicting the modulo remainder of the polynomial product for an irreducible polynomial; a storage circuit for supplying to said Galois field linear transformer a set of coefficients for predicting the modulo remainder for a predetermined irreducible polynomial; and a Galois field adder circuit for adding said product of said multiplier circuit with a third polynomial with coefficients over a Galois field for performing the compound multiply and add operations in a single cycle.

27. The advanced encryption standard (AES) engine with real time S-box generation of claim 1 in which said Galois field multiplier system includes: a polynomial multiplier circuit for multiplying two polynomials with coefficients over a Galois field to obtain their product; a Galois field linear transformer responsive to said polynomial multiplier circuit for predicting the modulo remainder of the polynomial product for an irreducible polynomial; a storage circuit for supplying to said Galois field linear transformer a set of coefficients for predicting the modulo remainder for a predetermined irreducible polynomial; and a Galois field adder circuit for adding said product of said multiplier circuit with an additive identity polynomial for performing a Galois field multiply function of the input polynomials in one cycle.

28. The advanced encryption standard (AES) engine with real time S-box generation of claim 1 in which said Galois field multiplier system includes: a polynomial multiplier circuit for multiplying two polynomials with coefficients over a Galois field to obtain their product; a Galois field linear transformer responsive to said polynomial multiplier circuit for predicting the modulo remainder of the polynomial product for an irreducible polynomial; a storage circuit for supplying to said Galois field linear transformer a set of coefficients for predicting the modulo remainder for a predetermined irreducible polynomial; and a Galois field adder circuit for adding said product of said multiplier circuit with said output of said Galois field linear transformer circuit to obtain Galois field multiply-accumulate function of the input polynomials m one cycle.

29. The advanced encryption standard (AES) engine with real time S-box generation of claim 1 further including a plurality of Galois field multiplier systems for simultaneously processing a plurality of subbytes.

30. The advanced encryption standard (AES) engine with real time S-box generation of claim 17 further including a plurality of Galois field multiplier systems for simultaneously processing a plurality of subkeys.

31. The advanced encryption standard (AES) engine with real time S-box generation of claim 3 in which said Galois field linear transformer has a matrix of cells for immediately predicting the modulo remainder of the succession of Galois field linear transforms of an irreducible Galois field polynominal to obtain the ultimate output of the Galois field linear transform directly in one transform cycle.

* * * * *